(12) United States Patent
Groenewald et al.

(10) Patent No.: US 9,126,765 B2
(45) Date of Patent: Sep. 8, 2015

(54) LINEAR MOTION CONVEYOR

(71) Applicants: Eugene Groenewald, Woerden (NL); Harm-Jan de Bruin, Leerdam (NL)

(72) Inventors: Eugene Groenewald, Woerden (NL); Harm-Jan de Bruin, Leerdam (NL)

(73) Assignee: KEY TECHNOLOGY, INC., Walla Walla, WA (US)

( * ) Notice: Subject to any disclaimer, the term of this patent is extended or adjusted under 35 U.S.C. 154(b) by 232 days.

(21) Appl. No.: 13/892,519

(22) Filed: May 13, 2013

(65) Prior Publication Data

US 2014/0332351 A1 Nov. 13, 2014

(51) Int. Cl.
*B65G 27/28* (2006.01)
*B65G 27/20* (2006.01)
*B65G 27/12* (2006.01)
*B65G 27/30* (2006.01)

(52) U.S. Cl.
CPC ............... *B65G 27/12* (2013.01); *B65G 27/28* (2013.01)

(58) Field of Classification Search
None
See application file for complete search history.

(56) References Cited

U.S. PATENT DOCUMENTS

| | | | |
|---|---|---|---|
| 4,339,029 A | 7/1982 | Wilson | |
| 5,794,757 A | 8/1998 | Svejkovske et al. | |
| 5,850,906 A | 12/1998 | Dean | |
| 5,934,446 A | 8/1999 | Thomson | |
| 5,979,640 A | 11/1999 | Horton | |
| 6,079,548 A | 6/2000 | Svejkovsky et al. | |
| 6,189,683 B1 | 2/2001 | Svejkovsky et al. | |
| 6,398,013 B1 | 6/2002 | Svejkovsky et al. | |
| 6,415,911 B1 * | 7/2002 | Svejkovksy et al. | 198/750.1 |
| 6,415,912 B1 | 7/2002 | Tamlin | |
| 6,601,695 B1 | 8/2003 | Rosenstrom | |
| 6,991,091 B2 * | 1/2006 | Thomson et al. | 198/752.1 |
| 7,216,757 B1 | 5/2007 | Patterson et al. | |
| 7,416,658 B2 | 8/2008 | Hur | |
| 7,650,986 B2 | 1/2010 | Kwasniewicz | |
| 7,975,835 B2 | 7/2011 | Pax | |
| 8,066,114 B2 | 11/2011 | Svejkovsky et al. | |
| 2001/0007300 A1 | 7/2001 | Svejkovsky et al. | |
| 2001/0047925 A1 | 12/2001 | Sullivan, Jr. | |
| 2004/0251113 A1 | 12/2004 | Tamlin | |
| 2011/0240442 A1 | 10/2011 | Svejkovsky et al. | |

FOREIGN PATENT DOCUMENTS

CA    2541539 C    4/2010

OTHER PUBLICATIONS

PCT Search Report dated Sep. 10, 2014.

* cited by examiner

*Primary Examiner* — Kavel Singh
(74) *Attorney, Agent, or Firm* — Randall Danskin PS

(57) ABSTRACT

A linear motion conveyor is described and which includes an elongated conveyor bed having a product transporting surface for supporting and transporting a product between the opposite first and second ends thereof, and a drive assembly oriented in force transmitting relation relative to the elongated conveyor bed, and where the elongated conveyor bed, when reciprocated by the drive assembly is operable to move product alternatively between the opposite ends of the product elongated conveyor bed in a first direction; a second direction; and which is further rendered operable to substantially stop the movement of the product located between the opposite ends of the elongated conveyor bed.

23 Claims, 23 Drawing Sheets

LINEAR MOTION CONVEYOR

TECHNICAL FIELD

The present invention relates to a linear motion conveyor, and more specifically to a linear motion conveyor having a drive assembly which may be readily and selectively adjusted so as to impart motion to a product being transported by the linear motion conveyor, in opposite first and second directions, or to further stop the motion of product along the linear motion conveyor.

BACKGROUND OF THE INVENTION

Various conveying arrangements and devices have been devised and employed through the years for conveying products of various types along predetermined courses of travel between work stations. These various types of conveyors have included reciprocating conveyors, shuffle conveyors, vibratory conveyors, or shaking conveyors. Further, linear motion conveyors have been developed, and which are considered by some users to be operationally distinguishable from the other mentioned types of conveyors.

In this regard, linear motion conveyors or what are sometimes referred to "differential impulse" conveyors include a generally elongated, horizontal tray or pan having a planar surface for transporting goods thereon. During operation of these linear motion conveyors, the tray is moved slowly forward to convey the goods with respect to the tray, and then is pulled rearwardly at a higher return speed so that the goods slide along the tray. The prior art acknowledges that one of the significant advantage of these linear motion conveyors is that fragile goods which are being transported on same may move along in a manner that does not tend to damage them because the products do not roll or tumble or move out of contact with the underlying conveying surface.

Various types of linear motion conveyors have been taught in the art. The Office's attention is directed to U.S. Pat. No. 5,794,757 to Svejkovsky et al. and which shows several forms of a preferred differential impulse conveyor, and method, and which is useful for transporting products. This reference is interesting because of the recited history surrounding the development of conveyors of this style. While this invention suggests that differential impulse conveyors have been preferred in applications such as food handling, and the like, the reality is that this industry segment has not widely embraced these types of conveyors because they have not achieved all the objectives that they claim they were able to produce. Further, such prior art conveyors have tended to generate much more noise, and vibration than what their advocates will readily admit. Typically, these vibrations have been transmitted into underlying supporting surfaces, floors or mezzanines upon which these conveyors were mounted.

Additionally, and because of the physical relationships which exist between the various parts of these prior art conveyors, such prior art conveying arrangements are not readily adjustable so as to provide different conveying speeds, directions of movement, or which further can be readily adjusted so as to either slow down or stop the movement of product along the linear motion conveyor in the event that problems in a production line work station which is located downstream from the linear motion conveyor would require such stoppage of the product motion.

While the prior art arrangements as disclosed in the aforementioned prior art patent, and other devices used in the art, have worked with some degree of success, an acute need has emerged to provide a conveyor arrangement which will allow a product transporting conveyor of the type, which will be described hereinafter, to move product along a given course of travel, and which further can be readily adjusted so as to change the direction or speed of movement of the product, or even stop the movement of the product along the conveying surface depending upon the needs of the user, and without stopping the operation of the invention.

A linear motion conveyor which operates in the manner, as described above, is the subject matter of the present device.

SUMMARY OF THE INVENTION

A first aspect of the present invention relates to a linear motion conveyor, which includes an elongated conveyor bed having opposite first and second ends, and a longitudinal axis, and wherein the elongated conveyor bed further has a product transporting surface which supports a product for movement between the first and second ends of the elongated conveyor bed; and a drive assembly oriented in predetermined, force transmitting relation relative to the elongated conveyor bed, and which, when energized, imparts reciprocal motion to the elongated conveyor bed to effect the selective movement of the product along the product transporting bed in a first direction which extends between the first and second ends of the product transporting surface; a second direction which extends from the second end, to the first end of the product transporting surface; and which further substantially stops the movement of the product which is located between the first and second ends of the elongated conveyor bed.

Another aspect of the present invention relates to a linear motion conveyor which includes an elongated conveyor bed having opposite first and second ends, and a product transporting surface which supports a product for movement between the first and second ends of the elongated conveyor bed; a base frame borne by a supporting surface, and which is pivotally affixed to the elongated conveyor bed, and wherein the base frame renders the elongated conveyor bed reciprocally moveable relative to the supporting surface, and wherein such reciprocal movement of the elongated conveyor bed effects the movement of the product along the product transporting surface; and a drive assembly coupled in force transmitting relation relative to the base frame, and which, when energized, transmits force to the base frame, to reciprocally rock the base frame, so as to cause the elongated conveyor bed to impart movement to the product along the product transporting surface, and wherein the drive assembly, when energized, is selectively adjustable so as to further cause the product to move in a first direction, from the first to the second end; a second direction, from the second end, and in the direction of the first end; and to further substantially prohibit the movement of the product which is located between the first and second ends of the product transporting surface.

Still a further aspect of the present invention relates to a linear motion conveyor which includes an elongated conveyor bed having opposite first and second ends, a top surface defining a product transporting surface which supports a product for movement between the respective opposite ends of the elongated conveyor bed, and a bottom surface, and wherein the elongated conveyor bed is supported in spaced relation relative to an underlying supporting surface; a base frame having first and second moveable frame portions which individually, moveably support the respective first and second ends of the elongated conveyor bed in spaced relation relative to the supporting surface, and wherein each of the first and second moveable frame portions have a respective first, or proximal end which is pivotally attached to the supporting surface, and an opposite, second, or distal end, which is pivotally affixed to the bottom surface of the elongated conveyor bed; a reciprocally moveable counter-weight frame mounted below, and in spaced relation relative to the elongated conveyor bed, and between the first and second moveable frame portions; a counter-weight mounted on the moveable counter-weight frame, and which is reciprocally moveable with the moveable counter-weight frame; a selectively moveable motor mount which is borne by the supporting surface, and which is further located below the bottom surface of the elongated conveyor bed; a selectively energizable motor mounted on the moveable motor mount, and which further has an output shaft; a first axle mounted below, and transversely relative to the elongated conveyor bed, and which is further coupled in force receiving relation relative to the output shaft of the selectively energizable motor, and wherein the selectively energizable motor, when actuated, imparts rotational movement to the first axle; a first eccentric weight mounted on the first axle, and which is co-rotatable therewith, and wherein the first eccentric weight has a first, and an opposite, second side or end; a second axle mounted below, and transversely relative to the elongated conveyor bed, and which is further located in a substantially parallel, non-coaxial orientation relative to the first axle; a second eccentric weight mounted on the second axle, and which is co-rotatable therewith, and wherein the second eccentric weight has a first side, portion or end, and an opposite, second side, portion or end; a first drive member having a first end which is eccentrically, rotatably coupled to the second axle, and an opposite, second end, which is coupled in force transmitting relation relative to the reciprocally moveable counter-weight frame, and wherein rotation of the second axle imparts reciprocal motion to the counter-weight frame; a second drive member having a first end which is eccentrically, rotatably couple to the second axle, and an opposite, second end, which is coupled in force transmitting relation relative to the second moveable frame portion, and wherein rotation of the second axle imparts reciprocal motion to the second, moveable frame portion, and further causes the elongated conveyor bed to reciprocate at a given speed, and which is effective in moving the product along the product transporting surface; and a drive link rotatably coupling together the first end of each of the first and second eccentric weights, and wherein the rotation of the first axle by the energizing of the selectively energizable motor transmits rotational force to the second axle by way of the drive link, and further causes the generation of a predetermined amount of reciprocal, vibratory force which is imparted to the elongated conveyor bed by the simultaneous rotation of the first and second eccentric weights, and wherein the generated vibratory force, in combination with the reciprocal movement of both the counter-weight frame, which carries the counter-weight, and the reciprocal motion of the elongated conveyor bed effects the movement of the product along the product transporting surface, and wherein the selective positioning of the moveable motor mount causes the elongated conveyor bed to selectively transport product along the product transporting surface in a first direction which extends from the first to the second end thereof; in a second direction which extends from the second end, to the first end thereof; and which further prohibits the movement of the product which is located between the first and second ends of the elongated conveyor bed.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
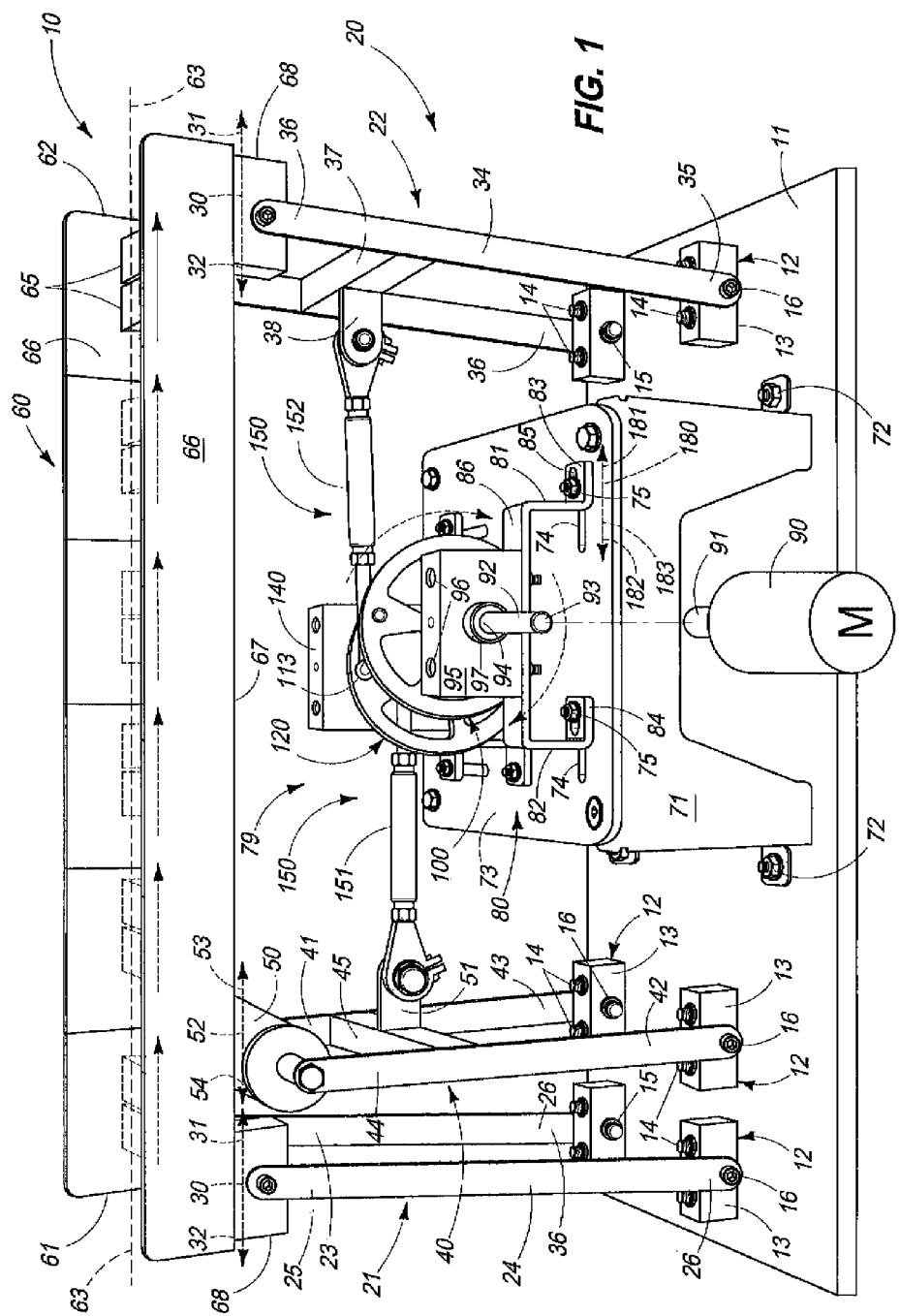
FIG. 1 is a perspective, side elevation view of the linear motion conveyor of the present invention.
Figure 2:
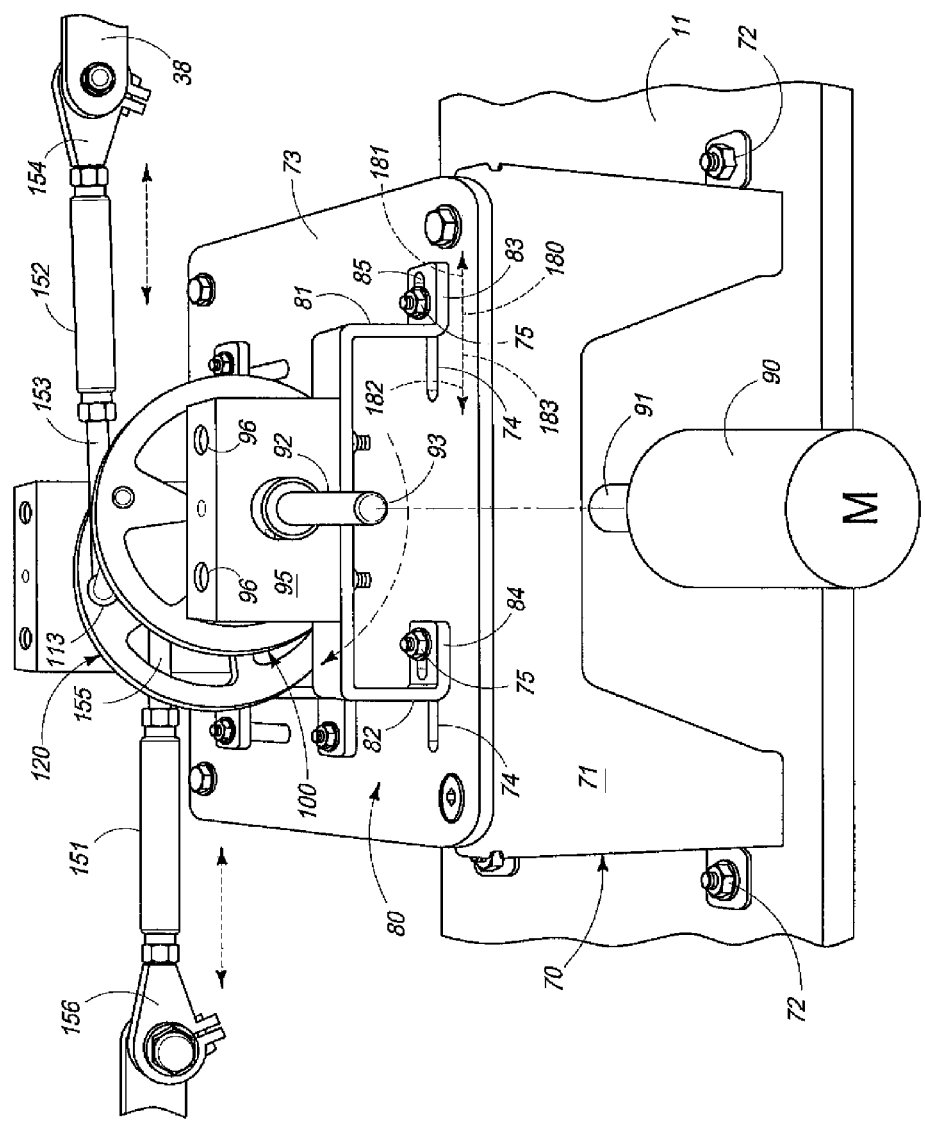
FIG. 2 is an enlarged, fragmentary, perspective, side elevation view of a drive assembly which finds usefulness in the present invention.
Figure 3A:
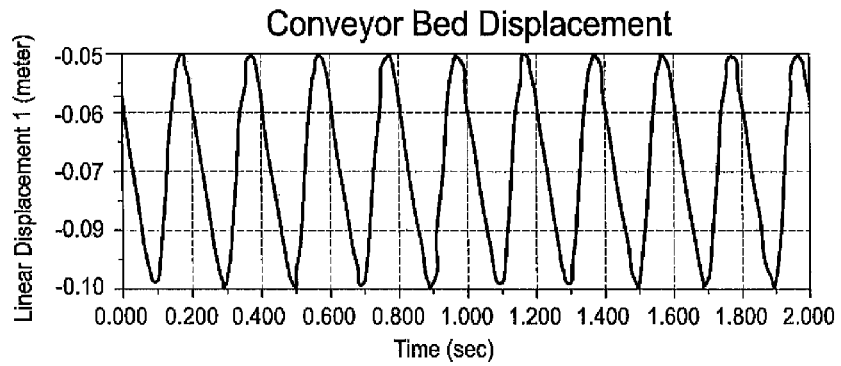
FIG. 3A is a graphical depiction of the conveyor bed displacement as displayed by the present invention.
Figure 3B:
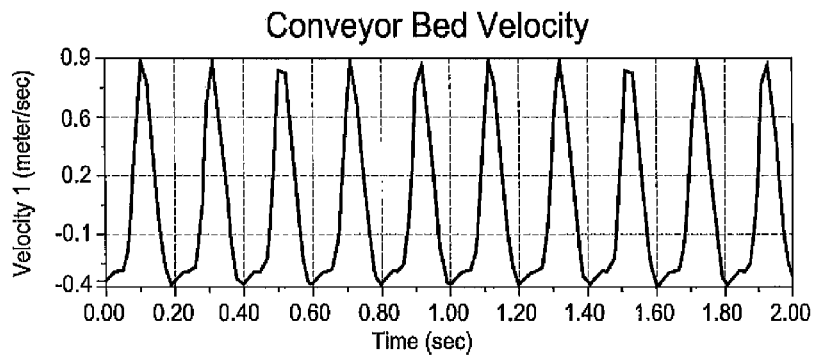
FIG. 3B is a graphical depiction of the conveyor bed velocity as displayed by the present invention.
Figure 3C:
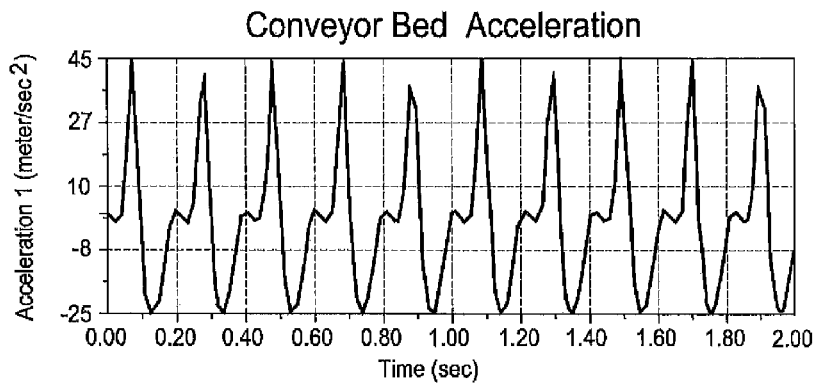
FIG. 3C is a graphical depiction of the conveyor bed acceleration as displayed by the present invention.

The linear motion conveyor of the present invention is generally indicated by the numeral 10 in FIG. 1 and following. As a general matter, the invention 10 is mounted on an underlying supporting surface which is generally indicated by the numeral 11 in FIG. 1. As will be seen, the underlying supporting surface may comprise a separate, and distinct, underlying surface, or may, on the other hand, be made integral with the underlying floor of a factory, or other supporting surface located therebeneath. As seen in FIG. 1, and following, the invention 10 includes a multiplicity of mounting blocks that are generally indicated by the numeral 12. The mounting blocks are identical in structure and function. The respective mounting blocks have a main body 13 which is fastened to the underlying supporting surface 11 by a pair of fasteners 14 which pass therethrough. Additionally, and as seen in the drawings, a passageway 15 is formed in the main body 13, and extends therethrough, and is operable to receive a threaded fastener 16 of conventional design.

As seen in FIG. 1 and following, the invention 10 includes a moveable base frame which is generally indicated by the numeral 20 and which is borne on the supporting surface 11. The moveable base frame includes a first frame portion 21, and an opposite, second frame portion 22. With regard to the first frame portion this feature of the invention includes opposite first and second legs 23 and 24 and which are located in substantially parallel, spaced relation one relative to the other. Each of the first and second frame portions 21 and 22 have a first, or proximal end 26 which is pivotally affixed to the main body 13 of the individual mounting blocks 12 by means of the conventional fasteners 16 that was earlier described. Further, the first and second frame portions 21 and 22 have an opposite, second, or distal end 27 which is then pivotally affixed to an elongated conveyor bed which will be discussed in greater detail, hereinafter. The moveable base frame 20, and more specifically the distal ends 27 are moveable along a predetermined reciprocal course of travel that is generally indicated by the numeral 30. The course of travel is defined between a first, or forwardly directed position 31, and a second, opposite, and rearwardly located position 32. As will be discussed in greater detail in this application, the first and second frame portions 21 and 22 are reciprocally moveable along this course of travel at different velocities in order to achieve the benefits of the present invention. Additionally, the moveable base frame as noted above, and more specifically the second frame portion 22 is defined by first and second legs 33 and 34, respectively, and which are disposed in substantially predetermined, substantially parallel, spaced relation one relative to the other. Again, the first and second legs have a proximal end 35 which is pivotally mounted on one of the respective mounting blocks 12, and an opposite, distal end 36 which is pivotally affixed to an elongated conveyor bed. The details of which will be discussed in greater detail, hereinafter. Again, the respective distal ends of the legs 36, which form the second frame portion 22, are moveable along the course of travel 30 as noted, above. The respective legs 33 and 34 are further held in predetermined spaced relation by a transversely disposed cross member 37. Further, this cross member mounts a coupling flange or portion 38 which is forcibly engaged by a drive member which will be discussed in further detail, hereinafter.

The present invention 10 includes a counter weight frame which is generally indicated by the numeral 40, and which is located between the first and second frame portions 21 and 22 of the moveable frame 20. The counter weight frame is defined by first and second legs 41 and 42, and which are of substantially similar length dimensions. The legs are located in predetermined, substantially parallel, spaced relation, one relative to the other. The respective legs 41 and 42 have a proximal end 43 which is affixed to the individual mounting blocks 12 by the fastener which is generally indicated by the numeral 16, and are thereby rendered pivotal or partially rotatable about same. Additionally, the respective first and second legs each have an opposite, and distal end 44. The first and second legs 41 and 42 are held in substantially parallel, spaced relation by a substantially transversely disposed cross member 45 which is affixed thereto by welding, and the like. As seen in FIG. 1, and following, a counter weight 50 having a given, predetermined weight, as will be discussed, hereinafter, is mounted on, and between, the distal ends 44 of the respective first and second legs 41 and 42, respectively. The counter weight 50 which, provides various operational features of the present invention, is here illustrated as being a substantially cylindrically shaped mass having a predetermined weight. However, it will be recognized that other similar shapes would work with equal success. An attachment bracket or flange 51 is mounted substantially centrally of the transverse cross member 45, and is affixed to a drive member as will be discussed in greater detail, hereinafter. The counter weight 50 is moveable along a reciprocal path of travel that is generally indicated by the numeral 52. The reciprocal path of travel is defined between a first, forward oriented position 53, and a second, rearward oriented position 54. The repeated reciprocal motion of the counter weight 50 as will be described, hereinafter, provides an assortment of operational characteristics for an elongated conveyor bed which will be discussed in greater detail in the paragraphs which follows.

The present invention 10 includes a reciprocally moveable, and elongated conveyor bed which is generally indicated by the numeral 60. The elongated conveyor bed has a first end 61, and an opposite second end 62. Still further, the elongated conveyor bed is generally defined by a longitudinal axis which is indicated by the line labeled 63. The elongated conveyor bed has a product transporting surface 64, and which is operable to be reciprocally moved in opposite directions, and at varying velocities so as to cause a product 65, which is deposited on the product transporting surface 64 to move between the opposite first and second ends 61 and 62 in a predetermined manner. The elongated conveyor bed also has a pair of spaced, substantially vertically disposed sidewalls 66 which confines the product 65 on the product transporting surface 64. The elongated conveyor bed 60 also has a bottom surface 67. As seen in the drawings, respective mounting blocks 68 are mounted on the opposite first and second ends 61 and 62 and on the bottom surface 67. As will be recognized by a study of FIG. 1, the distal end 27 of the first frame portion 21 is mounted on individual mounting blocks 68 which are affixed near the first end 61 of the elongated conveyor bed 60. The distal ends 27 are affixed by a conventional threaded fastener and thereby renders the distal ends 27 rotatable thereabout the mounting block 68. Likewise, the distal end 36 of the first and second legs 33 and 34 of the second frame portion 22 are similarly rotatably affixed by a conventional fastener to the individual mounting blocks 68 which are mounted on the bottom surface 67, and near the second end 62 thereof.

The present invention 10 includes a drive platform which is generally indicated by the numeral 70, and which is located in a position which is below the elongated conveyor bed 60, and between first and second frame portions 21 and 22, respectively. The drive platform 70 has a base portion 71 which is affixed by fasteners, of conventional design 72, to the supporting surface 11 as seen in FIG. 1. Additionally, the drive platform includes a substantially horizontally disposed motor mount support plate 73, and which has formed therein a pair of elongated passageways 74. Individual releasable fasteners 75 extend through the pair of elongated passageways 74 and facilitate the adjustable movement of a motor mount as will be described in the paragraphs which follows along a given course of travel in order to effect the unique, novel, operational characteristics of the present invention. The elongated passageways 74 are oriented in substantially parallel, spaced relation relative to the longitudinal axis 63 of the elongated conveyor 60.

A drive assembly 79, is described, hereinafter. The drive assembly includes a multiplicity of subassemblies, all of which will be described in detail. Generally speaking, the drive assembly 79 is oriented and operationally coupled in force transmitting relation to the elongated conveyor bed 60 so as to impart predetermined reciprocal motion to same to achieve the benefits of the present invention 10. A selectively moveable motor mount 80 which forms a portion of the drive assembly 79 rests in selectively adjustable, moving relation relative to the motor mount support plate 73. The selectively moveable motor mount 80 is depicted as having first and second leg members or portions 81 and 82, respectively. The respective first and second leg members or portions are defined, in part, by individual feet 83 and 84, respectively, and which lay in a substantially parallel, juxtaposed relationship relative to the motor mount support plate 73. An elongated passageway 85 is formed in each of the respective feet 83 and 84, respectively, and the releasable fastener 75 extends through the respective individual elongated passageways 74 which are formed in the motor mount support plate. The respective fasteners 75 secures the individual feet in a given, selective, predetermined location along the individually elongated passageway 74. The moveable motor mount 80 has an upper supporting surface 86 which will support a first axle as will be discussed in greater detail in the paragraphs which follows. While it will be understood that the motor mount, as described, is selectively moveable when the fasteners 75 are threadably released, one skilled in the art will recognize that the motor mount could be rendered selectively moveable by employing any number of other assemblies including all manner of pneumatic or hydraulic pistons, gear drives, and the like, and which can be selectively electrically or mechanically controlled so as to achieve the numerous benefits of the present invention.

In the greatly simplified view of FIG. 1, it will be understood by those skilled in the art, that the present invention 10 includes a selectively energizable motor 90 which is affixed to the moveable motor mount 80, so as to move in unison therewith. As depicted in FIG. 1, the motor 90 is shown detached from the motor mount 80 and located, at a distance, so as to allow a complete understanding of the operation of the present invention 10. However, it should be recognized that the selectively energizable motor is of conventional design, and has a rotatable output shaft 91 which is coupled in force transmitting relation relative to a first axle 92 as seen in FIG. 1, and following. This operable coupling of the output shaft 91 to the first axle 92 may be done by conventional means, that is, by belt, sprocket and chain, or direct coupling to the first axle 92 to effect the rotation of the first axle 92 in a given rotational direction as will be discussed, hereinafter. Again, the selectively energizable motor 90 may be coupled to suitable electronic controls (not shown) to effect the selective energizing of the motor 90 to initiate and stop the operation of the present invention 10 or further to selectively move the motor mount 80 to given operational locations which achieve the features of the invention which are disclosed. The first axle 92 has a proximal, or first end 93, and which is coupled in force receiving relation relative to the output shaft 91 of the selectively energizable motor 90. Still further, the first axle 92 has an opposite second, or distal end 94. A bearing block 95 is secured by fasteners 96 to the upper supporting surface 86 of the selectively moveable motor mount 80. Still further, the bearing block 95 releasably secures suitable bearings 97 so as to facilitate the appropriate rotational movement of the first axle 92 in the manner which will achieve the benefits of the present invention 10.

Figure 15:
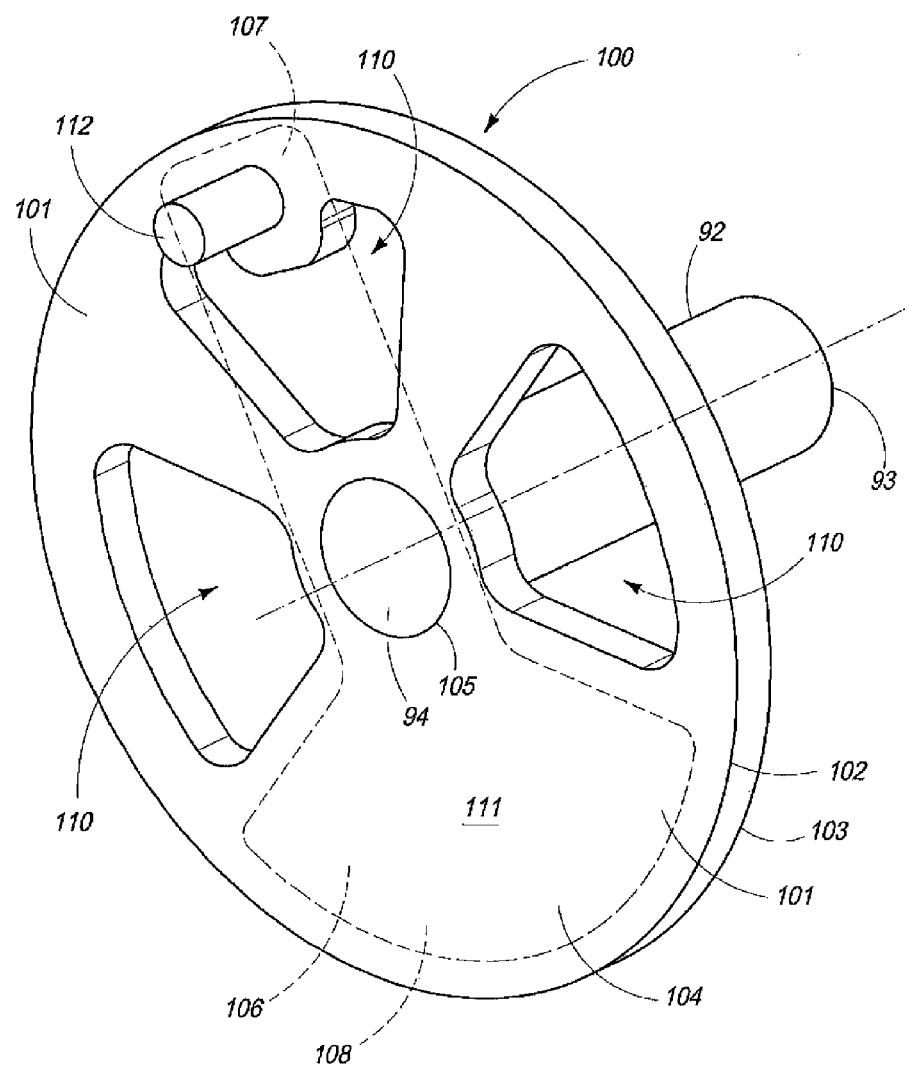
FIG. 15 is a fragmentary, perspective, side elevation view of a first eccentric weight, and which finds usefulness in the drive assembly as employed in the present invention.
Figure 16:
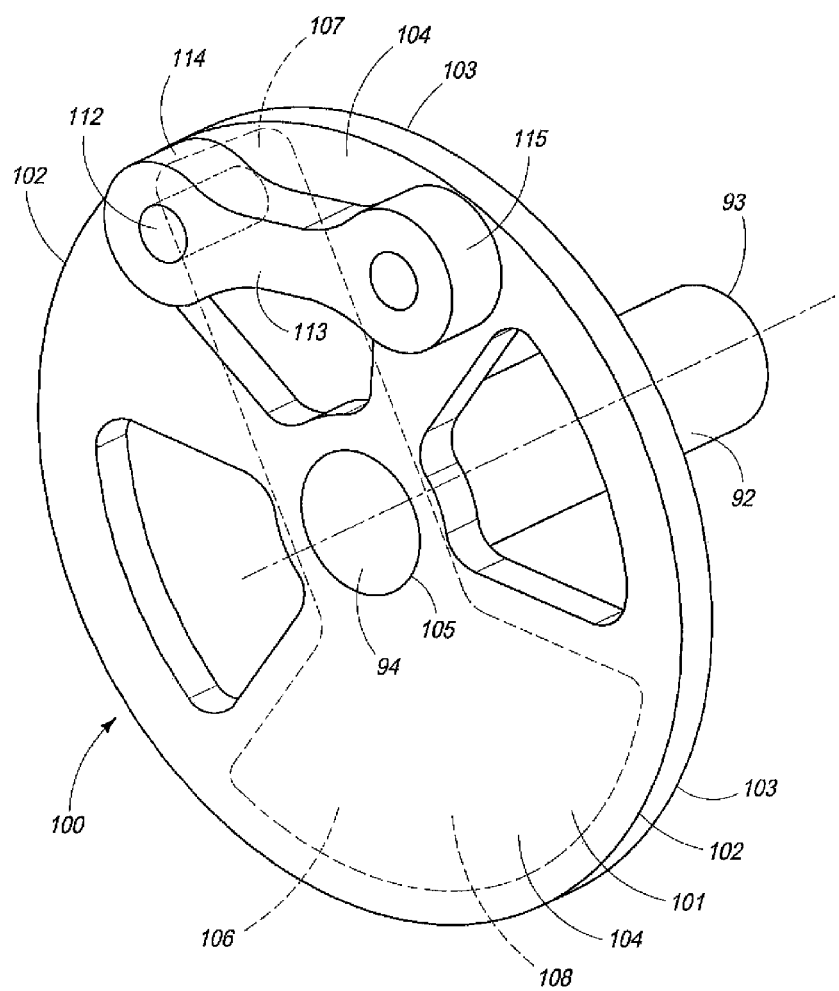
FIG. 16 is a fragmentary, perspective, side elevation view of a first eccentric weight which has attached thereto a drive link, and which further finds usefulness in the present invention.
Figure 17:
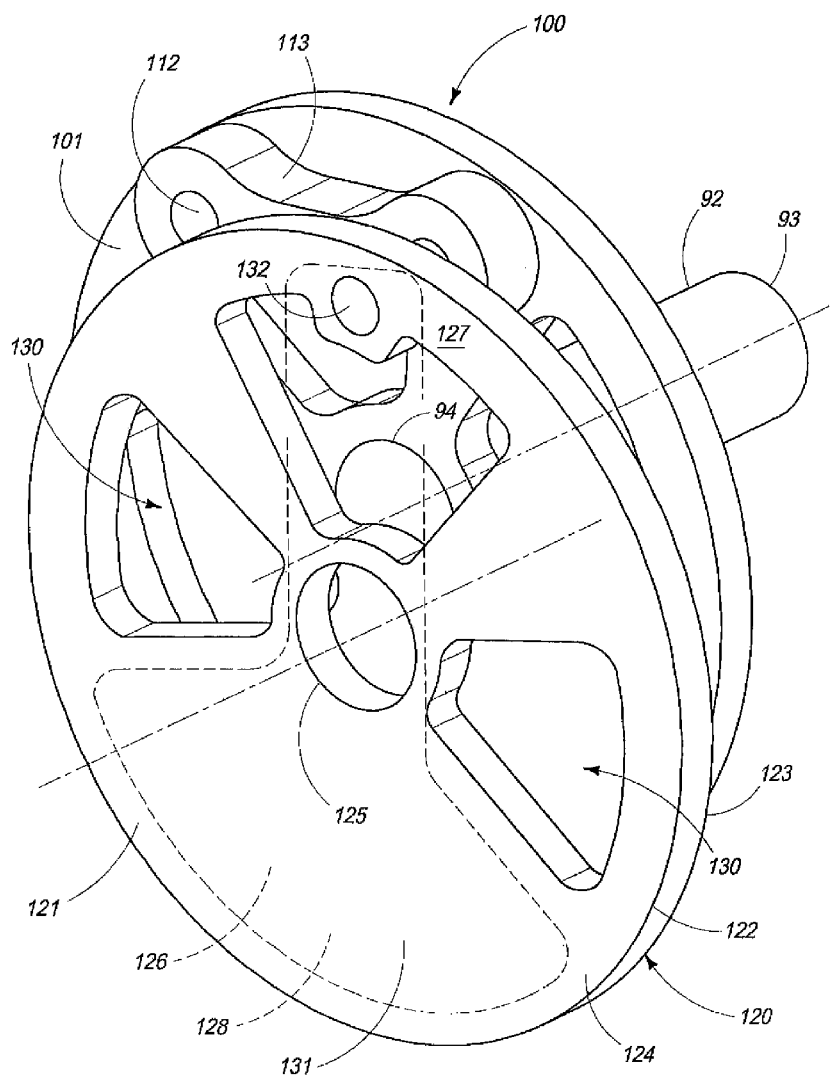
FIG. 17 is a fragmentary, perspective, side elevation view of a second eccentric weight which is coupled in force receiving relation to the drive link, and the first eccentric weight as illustrated in FIG. 15.
Figure 18:
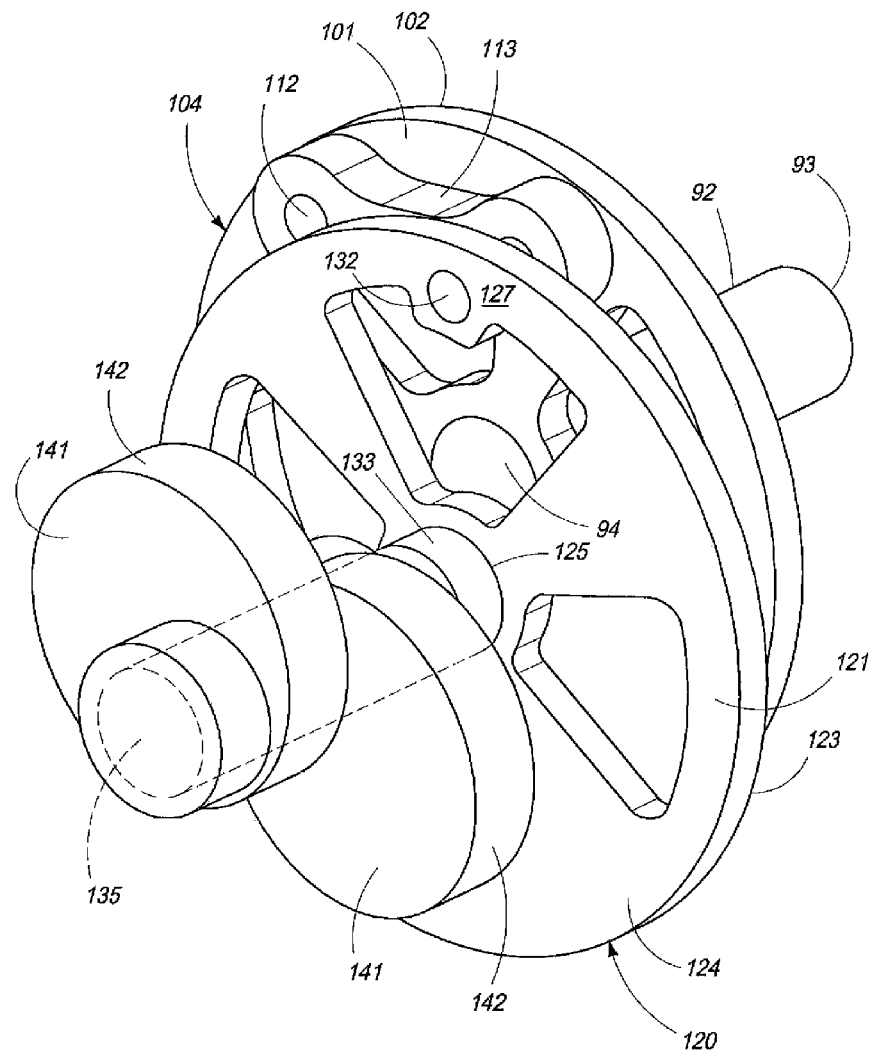
FIG. 18 illustrates a portion of the drive assembly of the present invention and which includes first, and second eccentric weights, and a second axle which mounts a pair of eccentric drive members thereon.
Figure 19:
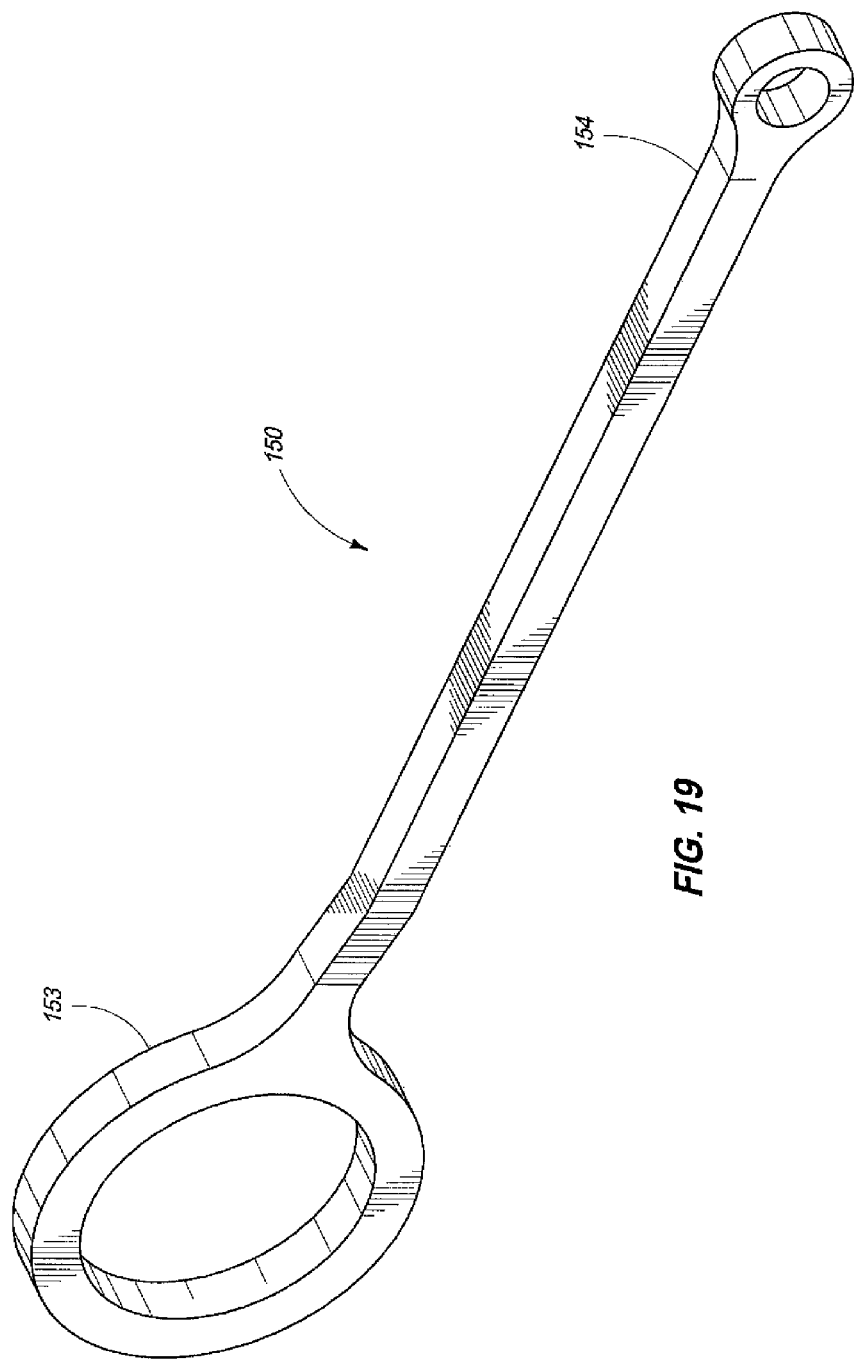
FIG. 19 is a perspective, side elevation view of one of the drive members which finds usefulness in the drive assembly as employed in the present invention.

Referring now to FIG. 15, mounted on the second, or distal end 94 of the first axle is a first eccentric weight, and which is generally indicated by the numeral 100. The first eccentric weight has a substantially circular main body 101 which is defined by a circular peripheral edge 102. Further, the circular main body 101 has a first outwardly facing surface 103, and an opposite, second inwardly facing surface 104. An axle aperture 105 is formed substantially centrally thereof, and is operable to matingly couple to the distal end 94 of the first axle 92. As seen in the drawings, the eccentric weight feature of the first eccentric weight 100 is generally indicated by the numeral 106. This structure is illustrated in phantom lines in FIGS. 15-17. This same structure or feature 106 is further seen in FIGS. 2-14 (in solid lines) and helps a reader understand the operation of the present invention. Otherwise, the operation of the invention 10 could not be clearly understood if the circular main body 101 as seen in FIGS. 15-17 were used throughout all the drawings. Therefore, in the later drawings (FIGS. 15-18, and 21), the eccentric weight feature 106 is shown in phantom lines, but it should be understood that this eccentric weight feature 106 is operationally characterized or otherwise physically expressed by the circular main body 101 as seen most clearly by reference to FIG. 15. The first eccentric weight feature 106 shown in the drawings has a first end side or portion 107, and an opposite second end side or portion 108.

The first eccentric weight 100 (FIG. 15) has a multiplicity of truncated-shaped passageways or other apertures formed in a given pattern therein, and which defines, in part, an eccentrically weighted region, or portion and which is generally indicated by the numeral 111. Still further, and opposite to the eccentrically weighted portion 111, the first eccentric weight 100 includes a coupling post 112 which is located near the peripheral edge 102, and which further extends normally outwardly therefrom. The coupling post is operable to rotatably engage a drive link which is generally indicated by the numeral 113. The drive link 113 has a first end 114 which rotatably engages or couples to the coupling post 112, and an opposite second end 115 which rotatably couples with a second eccentric weight which will be generally indicated by the numeral 120, and which is discussed in the paragraphs which follow.

The present invention 10 includes a second eccentric weight 120, and which is best seen by reference to FIG. 17. Again, the second eccentric weight 120 is similar to the first eccentric weight 100, and further includes a circular main body 121 which is defined by a peripheral edge 122. The circular main body 121 has a first outwardly facing surface which is disposed in predetermined, spaced, substantially parallel relationship relative to the second inwardly facing surface 104 of the first eccentric weight 100. Still further, the main body 121 is defined by a second, inwardly facing surface which is generally indicated by the numeral 124. Again, similar to the first eccentric weight 100, the second eccentric weight 120 includes an axle aperture 125 which is formed substantially centrally thereof. Similar to that seen earlier, and discussed, the second eccentric weight 120 defines a second eccentric weighted feature 126, and which is shown in phantom lines, and which is further illustrated in FIG. 17 so as to provide a convenient means by which one skilled in the art can understand the operation of the present invention. This structure is seen, for example, in FIGS. 5-14 in solid lines to facilitate an understanding of the invention 10. Again, the second eccentric weighted feature 126 has a first end, side or portion 127, and an opposite second end, side or portion 128. Similar to that which was earlier described, with respect to the first eccentric weight 100, a multiplicity of passageways 130 are formed in the circular main body 121 of the second eccentric weight 120. The multiplicity of passageways 130 provides a means for forming a weighted eccentric portion 131. Again, a coupling post 132 is provided and which is mounted on the first, outwardly facing surface 123, and which is further directed, orientated, or extends in a direction towards the first eccentric weight 100. The coupling post 132 is rotatably coupled to the second end 115 of the drive link 113. As will be recognized, the drive link 113 couples the first end 107 of the first eccentric weight in force transmitting relation to the first end 127 of the second eccentric weight 120. The present invention 10 includes a second axle 133 which has a first, or proximal end 134 which is matingly received in the axle aperture 125. The second axle 133 further has a second or distal end 135 which is rotatably supported in a given orientation as will be discussed in greater detail in the paragraphs which follows.

Figure 20:
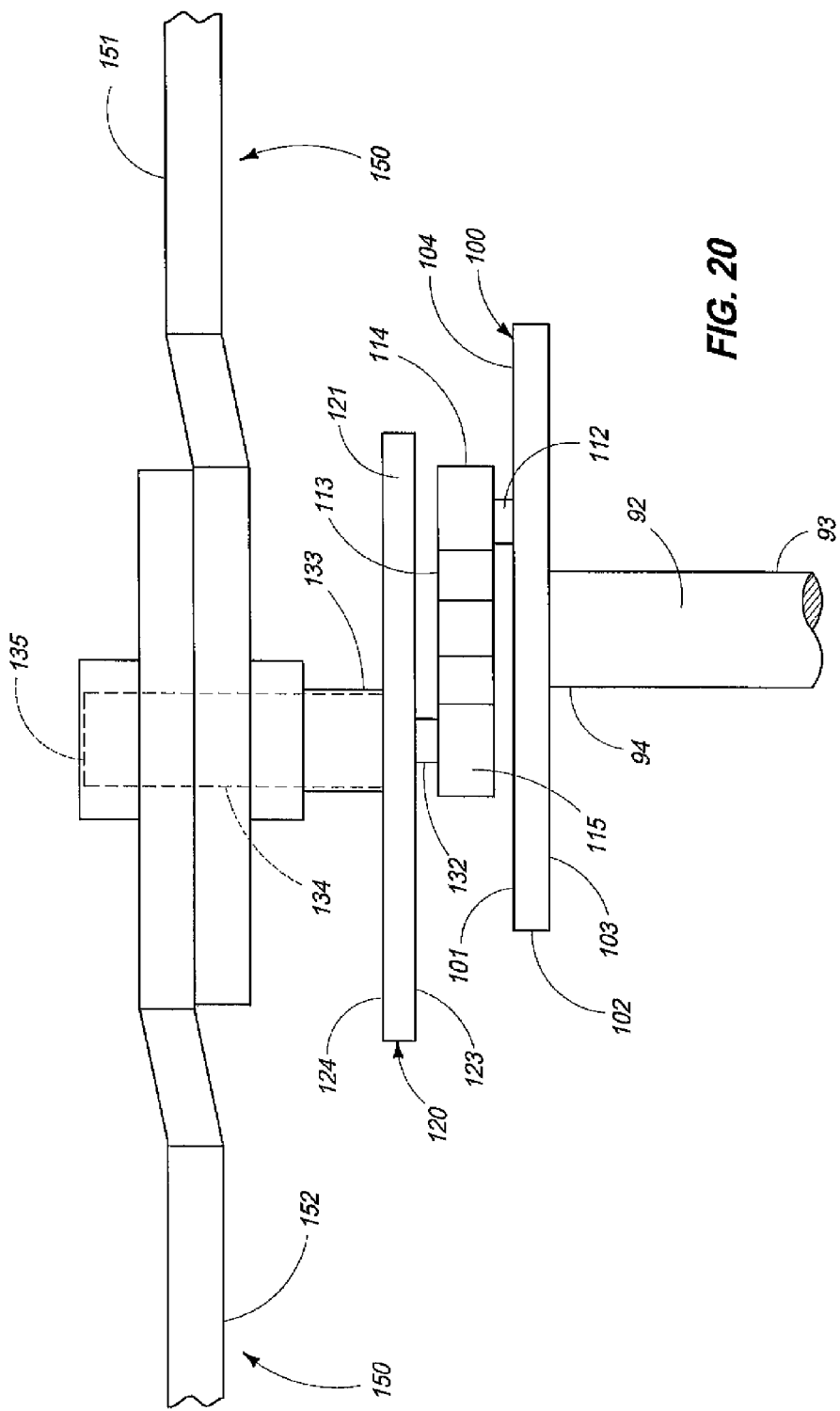
FIG. 20 is a fragmentary, top plan view of a portion of the drive assembly as employed in the present invention.
Figure 21:
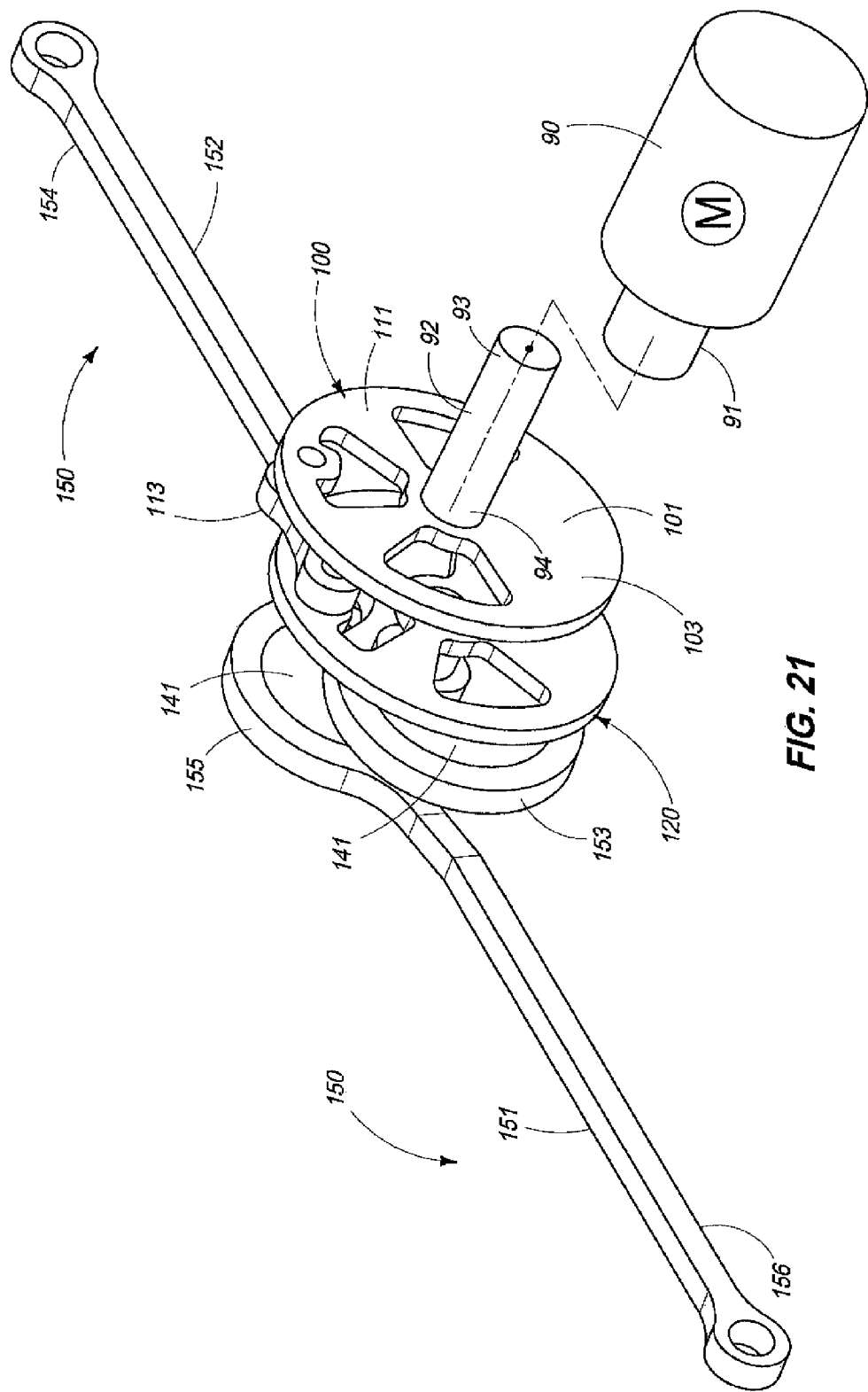
FIG. 21 is a perspective, side elevation view of a portion of an assembled drive assembly as utilized in the present invention.

As best seen in FIG. 1, and following, a second bearing block 140, similar to that described with respect to the first mentioned bearing block 95, is mounted in a location on the drive platform 70 so as to appropriately rotatably support the second axle 133 for substantially horizontal, rotational movement. As best illustrated by reference to FIGS. 11 and 18, a pair of eccentric drive coupling members 141 are mounted in predetermined, spaced relation along the second axle 133. Each of the drive coupling members are eccentrically mounted to the second axle 133, and are further defined by a peripheral edge 142. Rotatably mounted on, and about the peripheral edge 142 of each of the respective drive coupling members 141, is a drive member which is generally indicated by the numeral 150. This pair of drive members 150 includes a first drive member 151, and a second drive member 152. The first drive member 151 has a first end 153 which is mounted for rotation on the second drive coupling members 142, and further has a second end 154 which is coupled in force transmitting relation relative to the counter-weight frame 40. As should be understood, force transmitted by the first drive member 151 is effective to move the counter-weight frame 40 along a reciprocal path of travel 52 in order to carry the counter-weight 50 in a corresponding reciprocal path of travel as will be discussed, hereinafter, so as to affect, at least in part, the motion of the product 65 along the product transporting surface 64 in predetermined directions. Additionally, the second drive member 152 has a first end 155 which is mounted to the first drive coupling member 141, and further has a second end 156 which is coupled in force transmitting relation relative to the attachment bracket 38 which is affixed to the second frame portion 22. In this arrangement, force transmitted by the second drive member is effective in moving the moveable base frame 20 along the reciprocal path of travel 30 between the first, forward position 31, and the second rearward position 32. As will be recognized by a study of FIGS. 5 and 20, it will be seen that the first axle 92 and the second axle 133 are disposed in substantially parallel, spaced relation, and are further oriented in a non-coaxial relationship one relative to the other. Still further, the first and second axles are each disposed substantially transversely relative to the longitudinal axis 63 of the elongated conveyor bed 60. As will be recognized from a study of the drawings, energizing of the selectively energizable electric motor 90 is effective in causing rotational movement of the first axle 92. This rotational motion of the first axle 92 is effective for rotating the first eccentric weight 100 in a given direction. The imparted rotational motion of the first eccentric weight 100, in turn, transmits force through the drive link 113. The force transmitted by the drive link 113 then imparts rotational movement to the second eccentric weight 120. Again, rotation of the second eccentric weight is effective in causing a corresponding rotation of the second axle 133. The corresponding rotation of the second axle 133 transmits force through the respective drive coupling members 141 which are eccentrically mounted about the second axle. The eccentric rotation of the respective drive couplings 141 are operable to cause reciprocal, eccentric force to be transmitted by way of the first and second drive members 151 and 152, respectively. The reciprocal force transmitted by the first drive member 151 is effective in causing the counter-weight frame 40 to move the counter-weight 50 along the path of travel 52, and the first and second frame portions 21 and 22 to cause the elongated conveyor bed 60 to reciprocate, as earlier described. Further, the rotation of the first and second eccentric weights 100 and 120, respectively, along with the reciprocal motion of the counter weight 50 is effective in causing force to be transmitted through the moveable base frame 120 so as to effect movement of product 65 along the conveyor bed 60 in the fashion which will be discussed in greater detail, hereinafter.

Figure 4A:
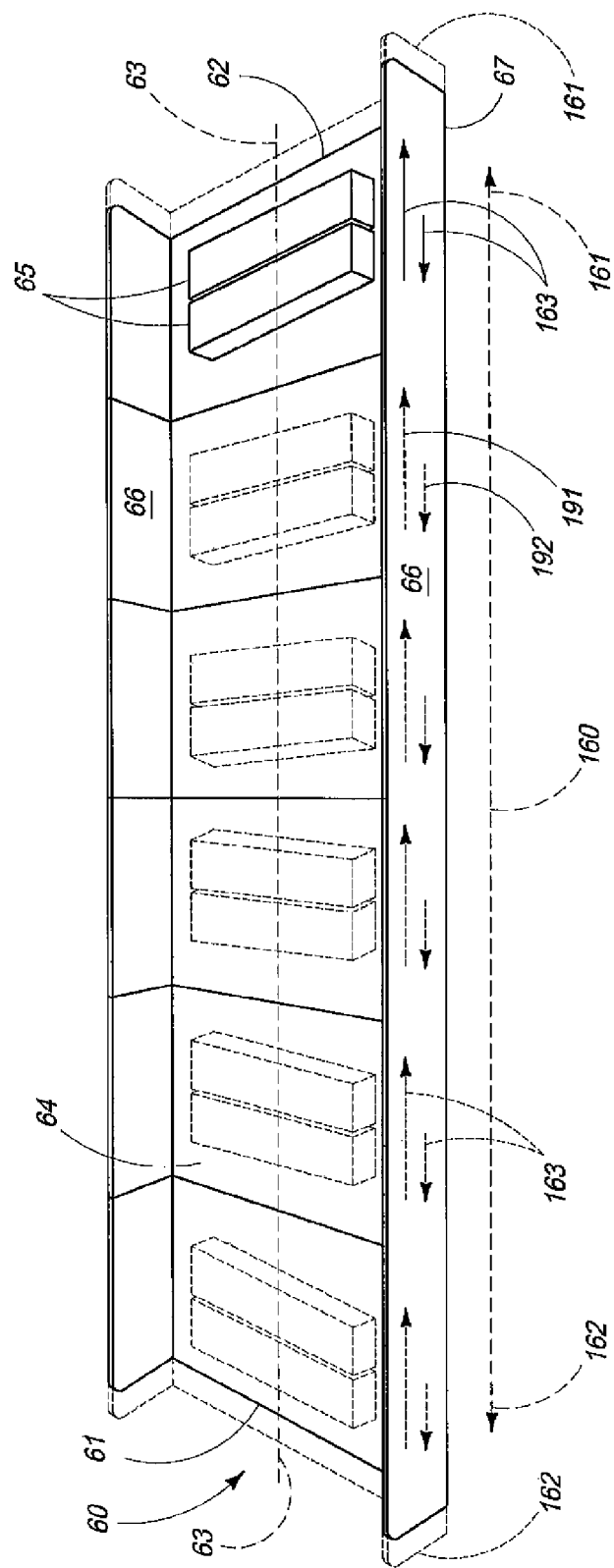
FIG. 4A is a fragmentary, perspective, side elevation view of the conveyor bed of the present invention transporting product in a predetermined first direction.
Figure 4B:
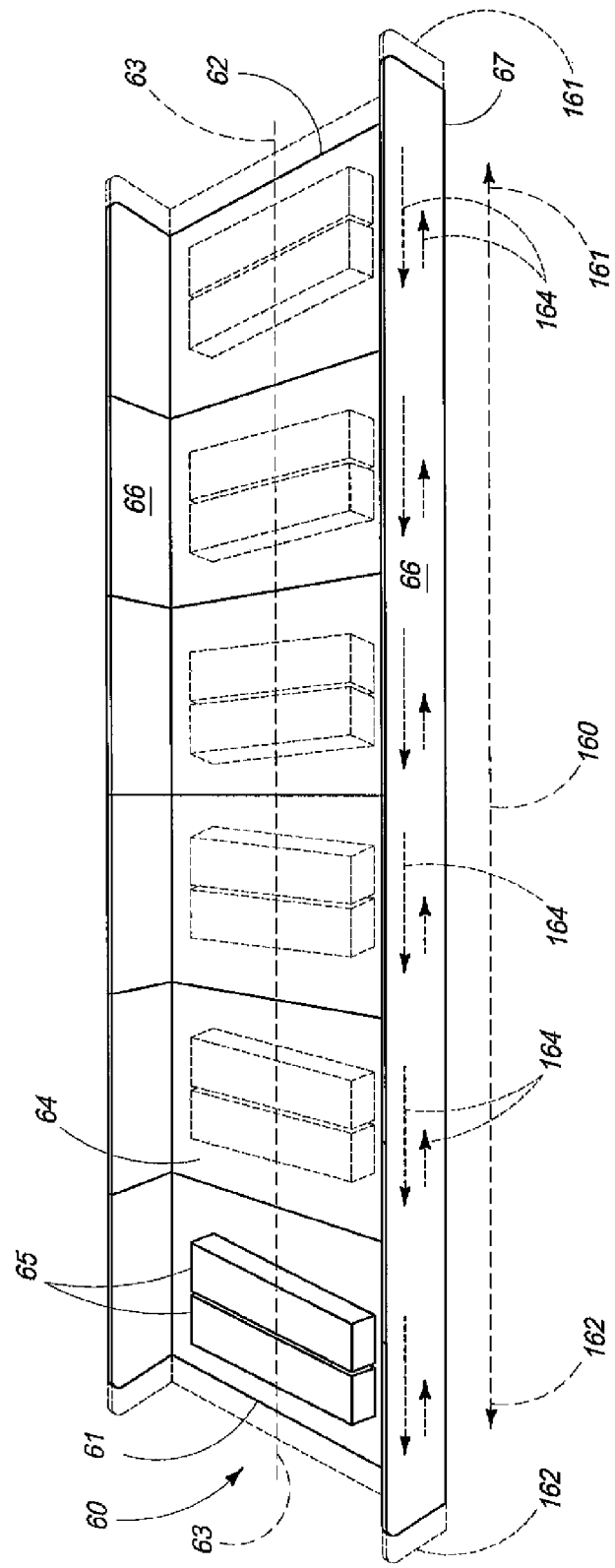
FIG. 4B is a fragmentary, perspective, side elevation view of the conveyor bed of the present invention transporting product in a predetermined, opposite, second direction.
Figure 4C:
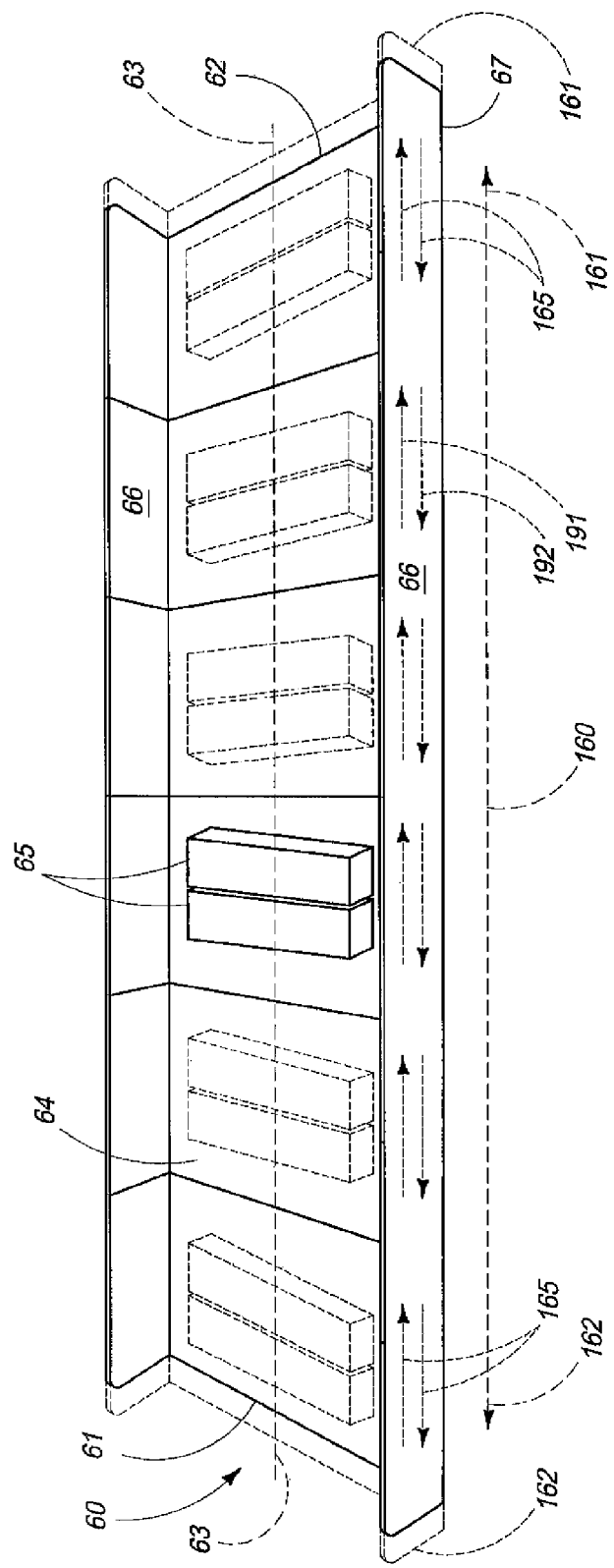
FIG. 4C is a fragmentary, perspective, side elevation view of the conveyor bed of the present invention, and which is depicted as not transporting product in either the first or second directions as seen in FIG. 4A or 4B, respectively.
Figure 5:
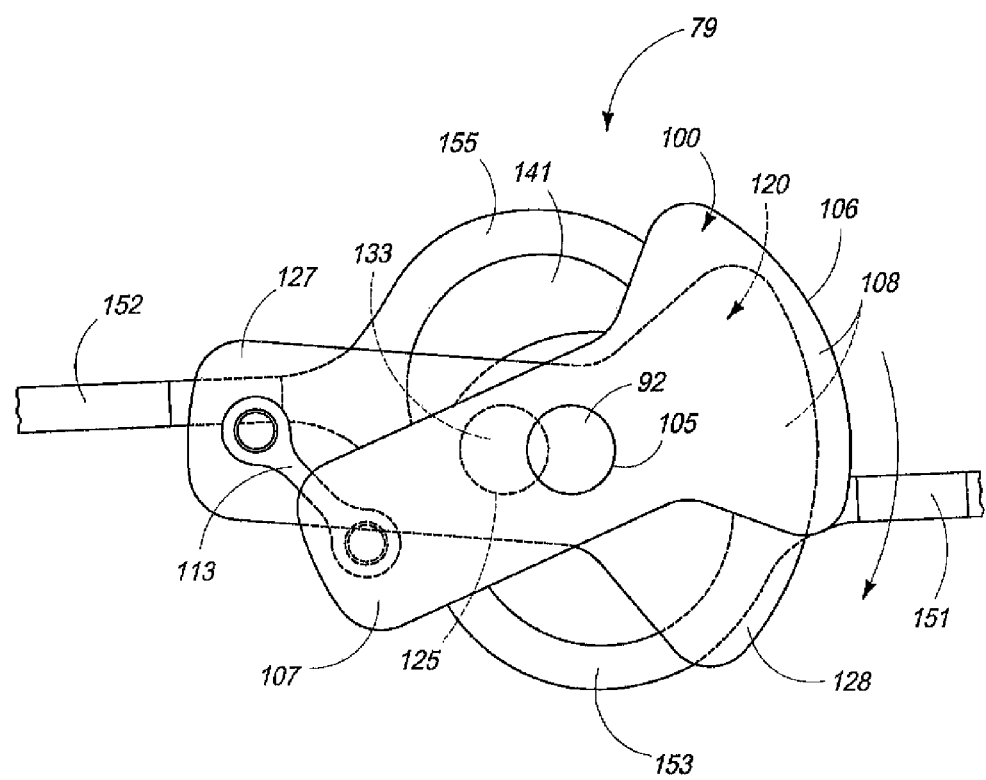
FIG. 5 is a fragmentary, side elevation view of a pair of rotatable, eccentric weights and associated eccentrically mounted drive members, with other underlying surfaces shown in phantom lines.
Figure 6:
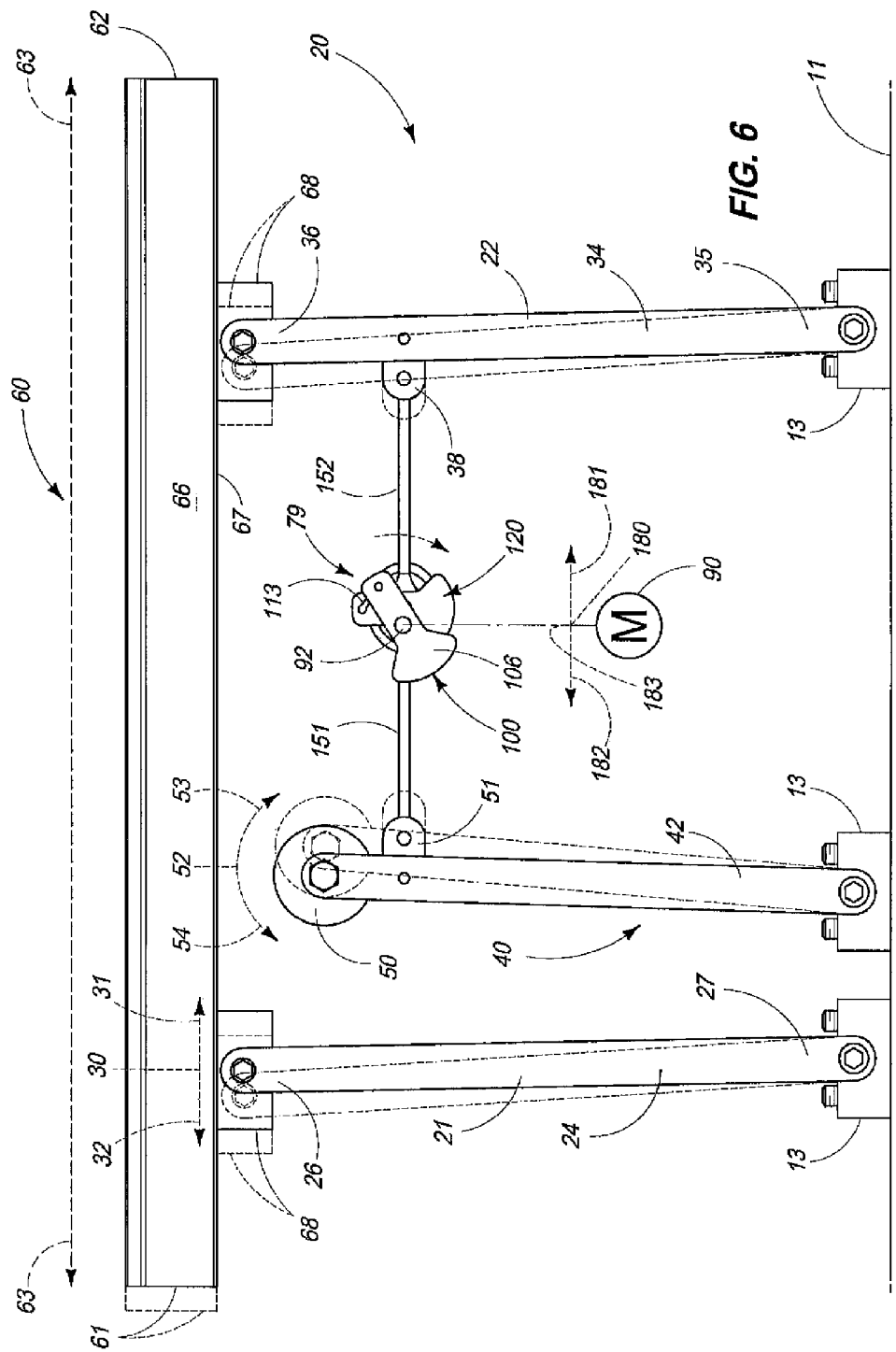
FIG. 6 is a greatly simplified, fragmentary, side elevation view of the present invention with some subassemblies removed in order to show the structure, and function of the present invention.
Figure 7:
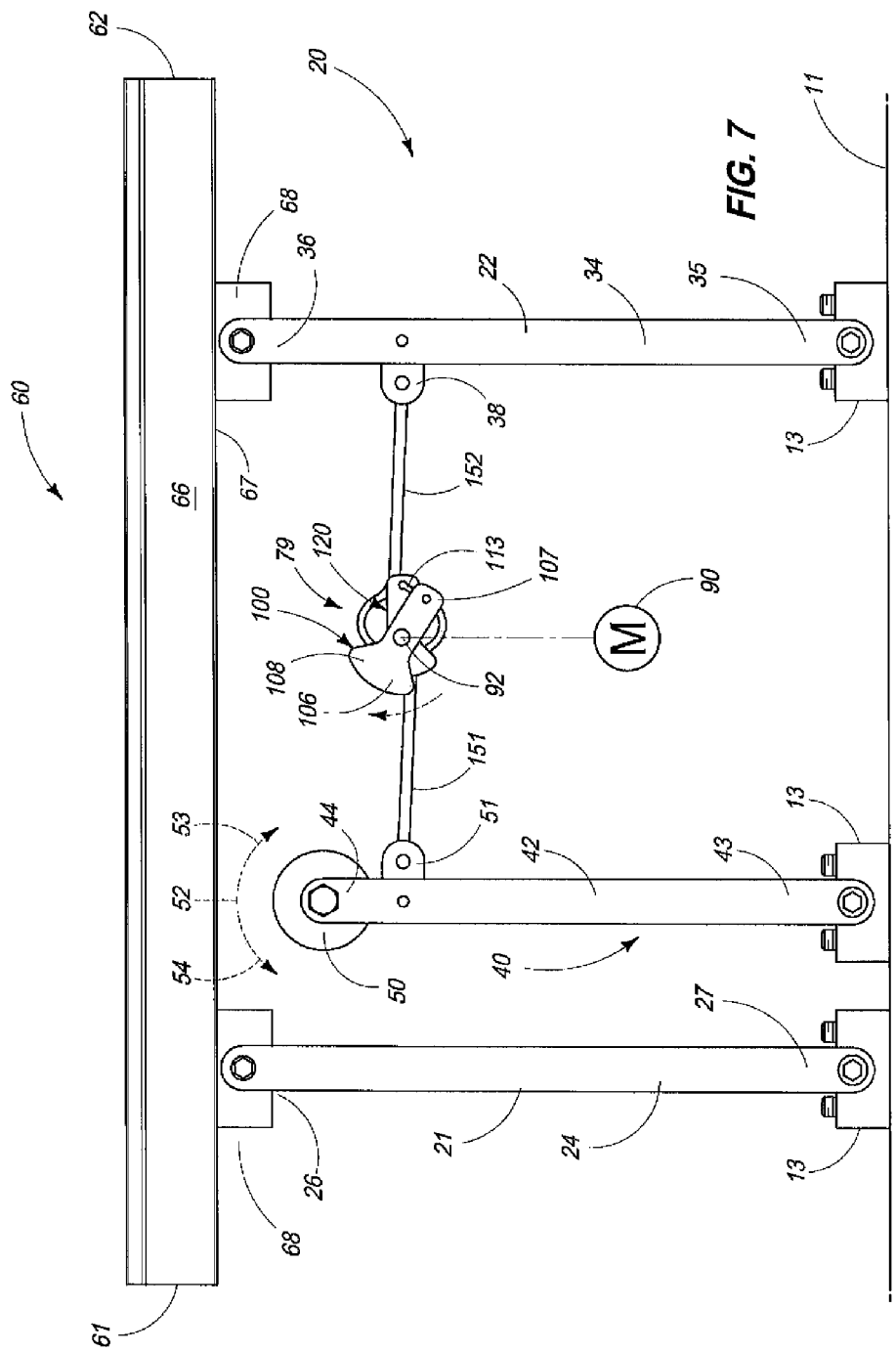
FIG. 7 is a greatly simplified, fragmentary, side elevation view of the present invention, and which is shown in a second position at a point later in time from that seen in FIG. 6.
Figure 8:
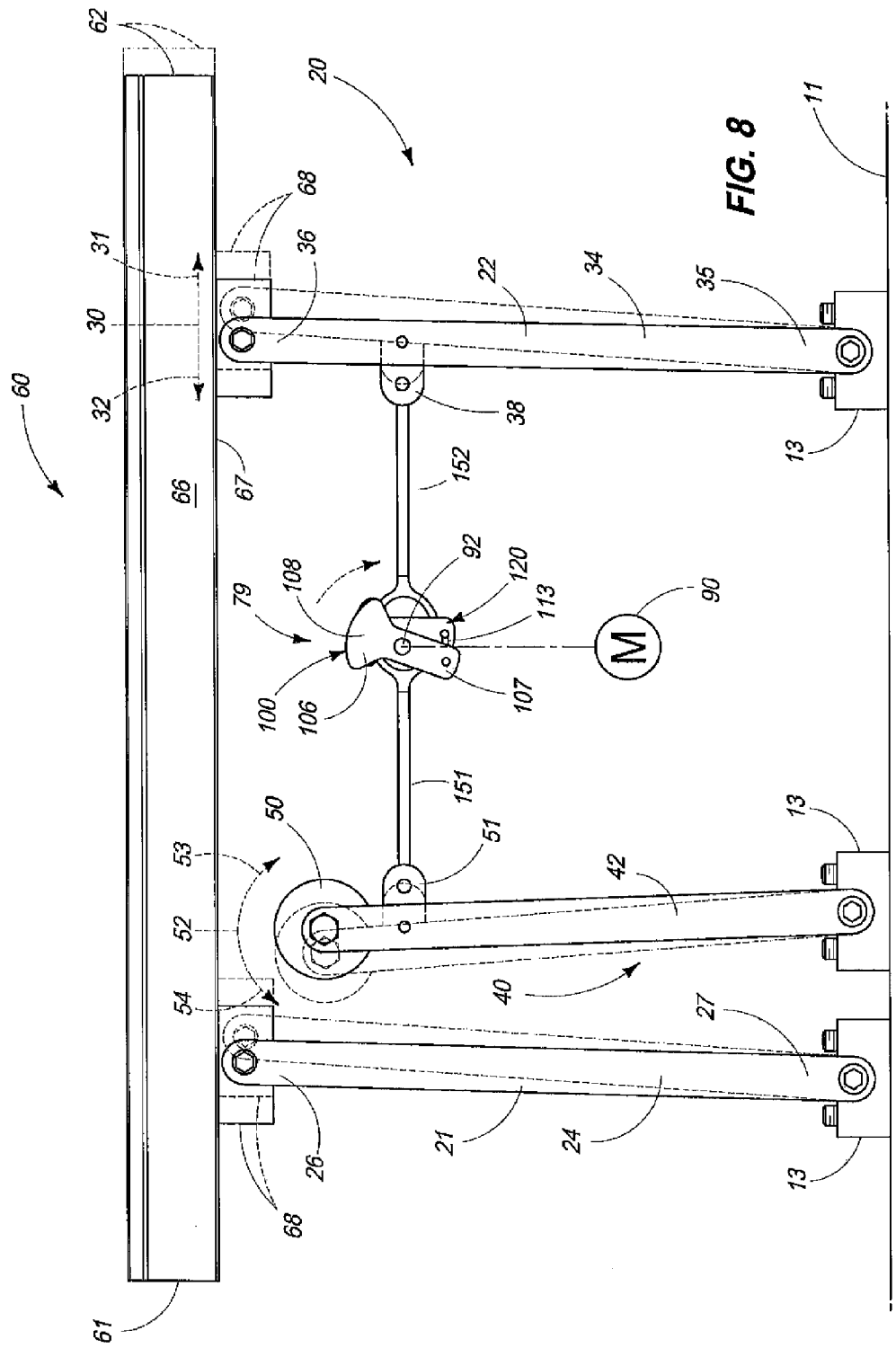
FIG. 8 is another, greatly simplified, fragmentary, side elevation view of the present invention and which is shown in yet still another operational position at a point later in time from that shown in FIGS. 6 and 7.
Figure 9:
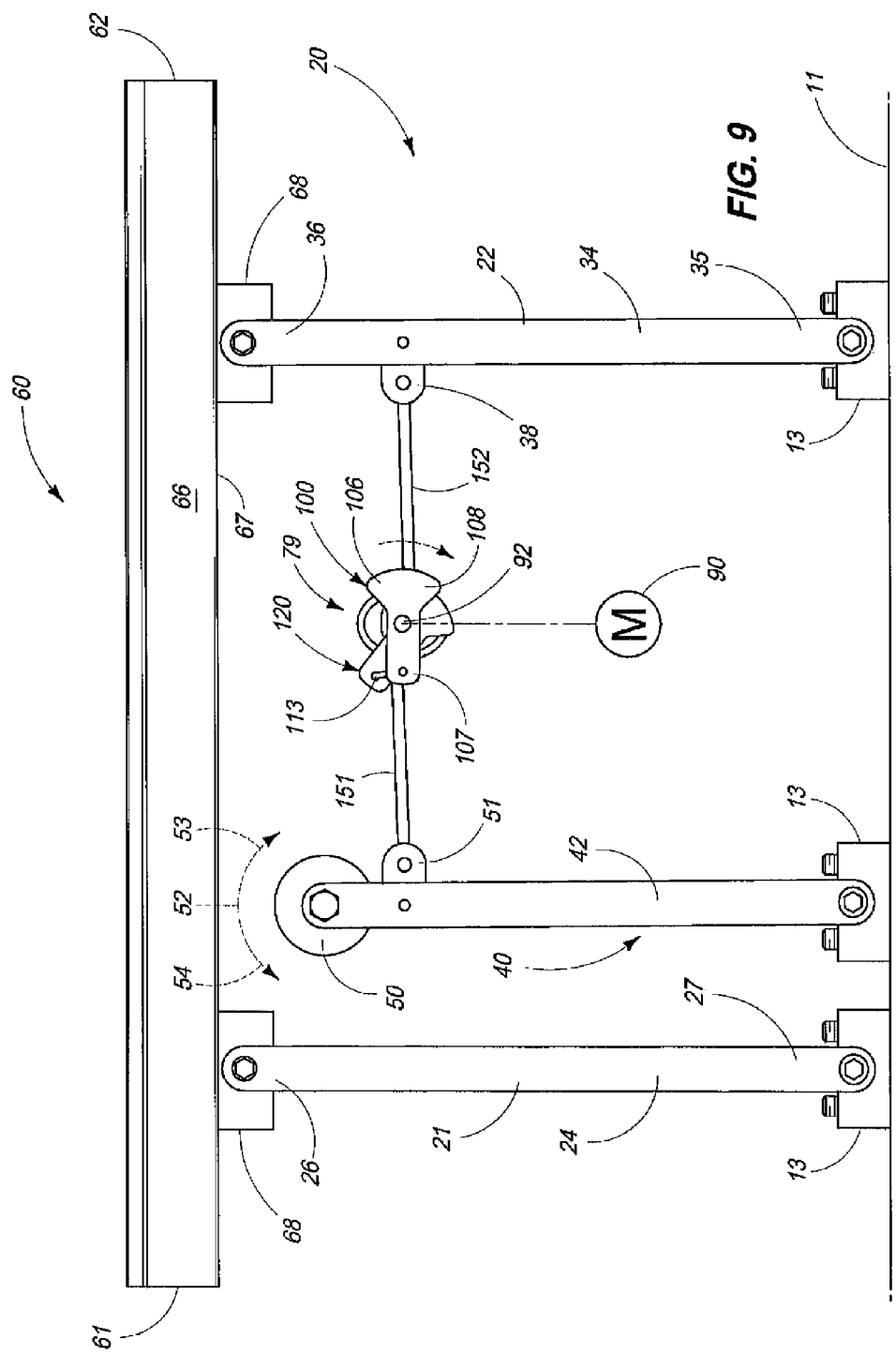
FIG. 9 is yet another, greatly simplified, fragmentary, side elevation view of the present invention and which is shown in a position at a point which is later in time from that shown in FIG. 6, 7 or 8.
Figure 10:
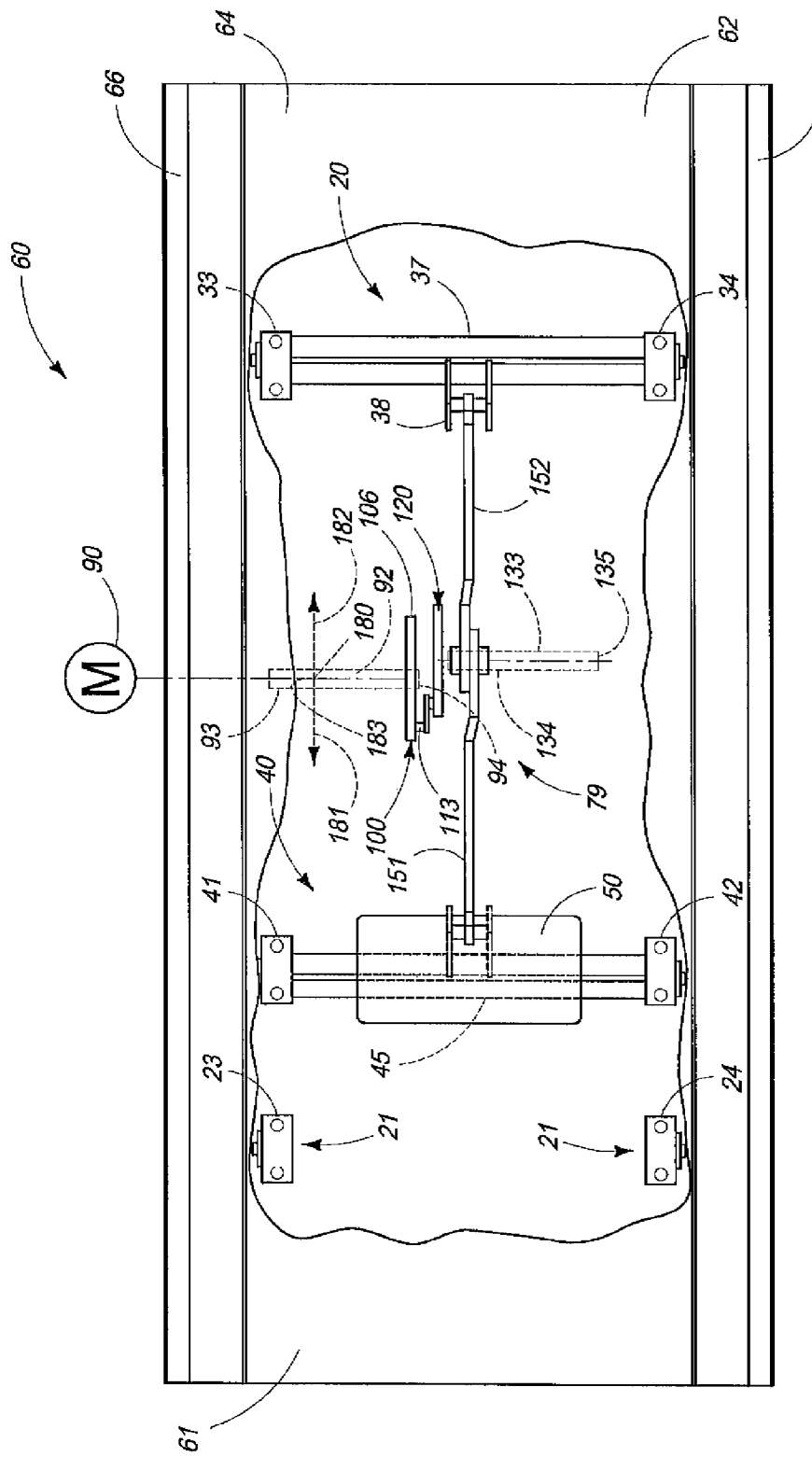
FIG. 10 is a fragmentary, top plan view of the present invention, with some supporting surfaces and structures removed, to illustrate the construction thereunder.
Figure 11:
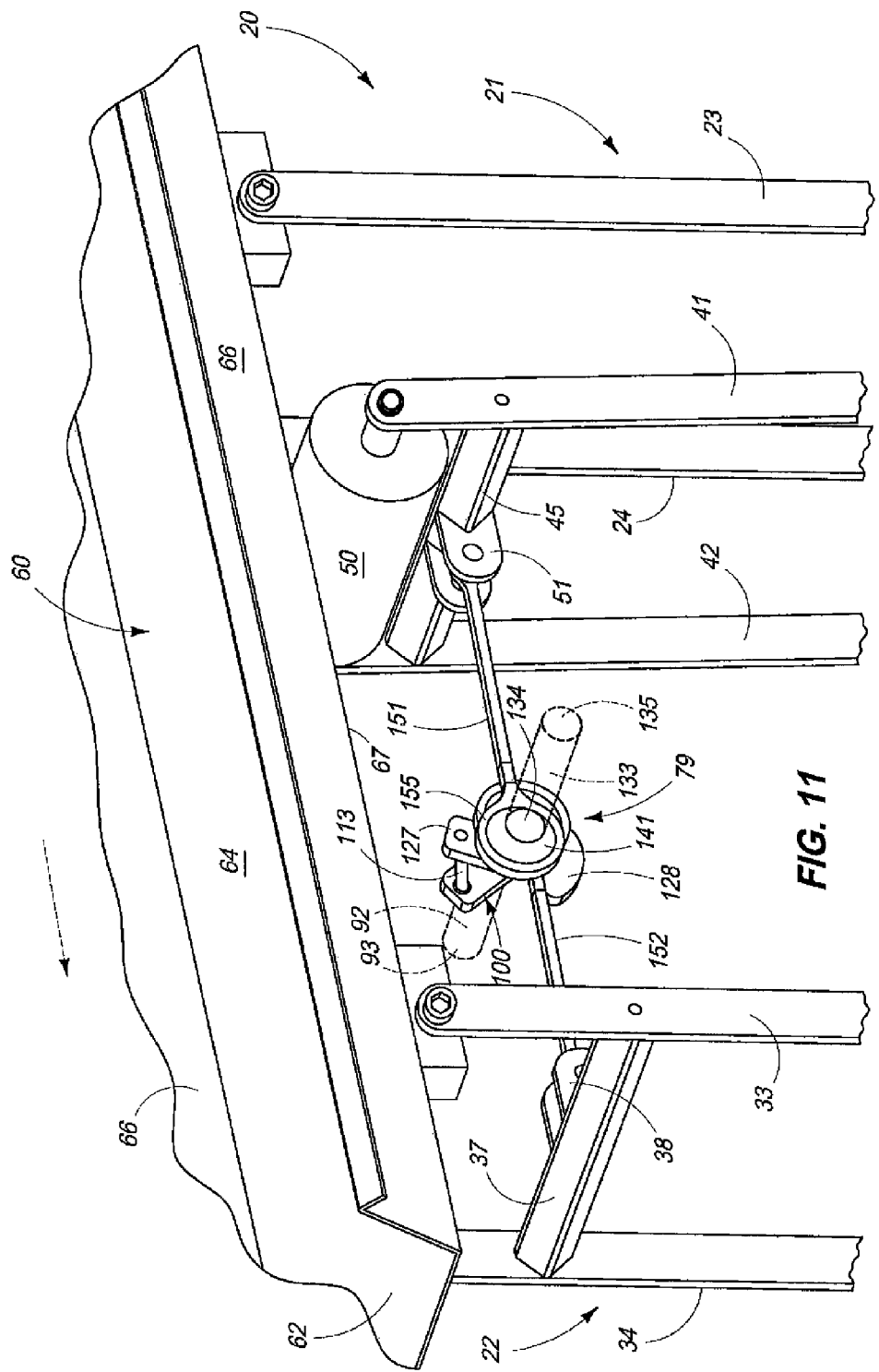
FIG. 11 is a greatly simplified, fragmentary, perspective, side elevation view of the present invention with some subassemblies removed to show the structure, and operation of the invention.
Figure 12:
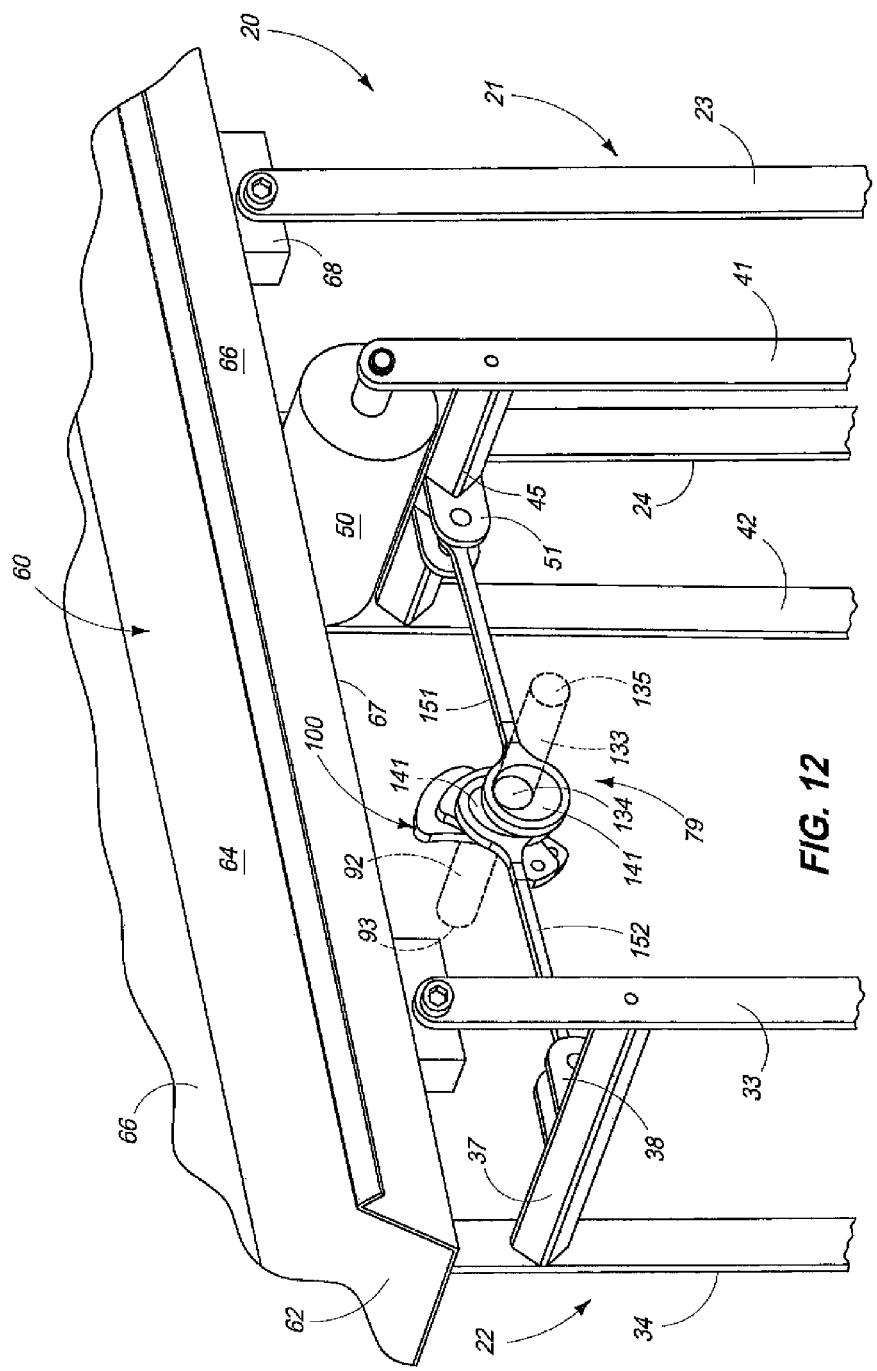
FIG. 12 is a greatly simplified, fragmentary, perspective, side elevation view of the present invention, with some subassemblies removed, to show at least some of the structure of the invention, and which further illustrates the invention in a position different from that seen in FIG. 11.
Figure 13:
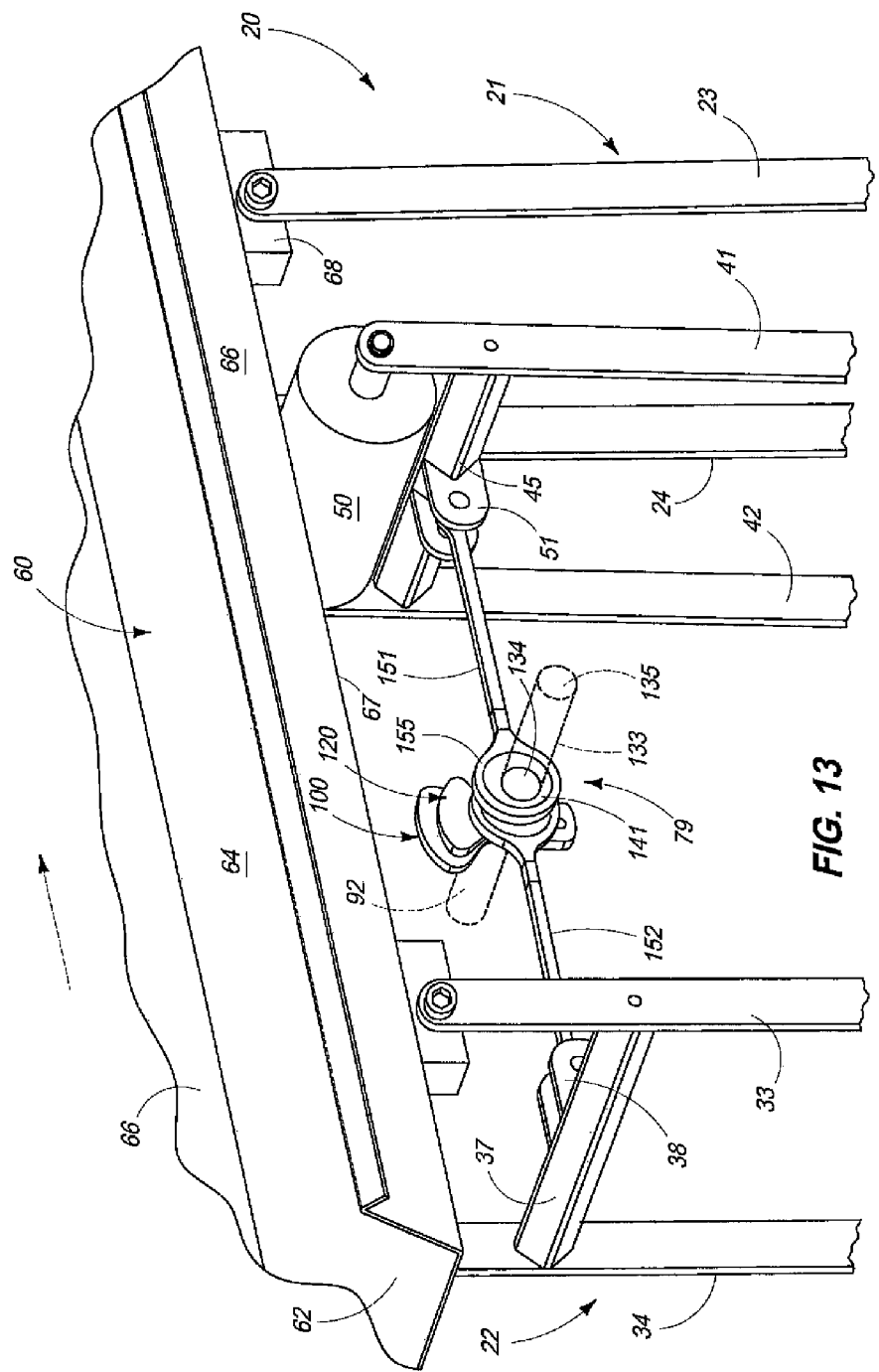
FIG. 13 depicts the present, greatly simplified invention in yet another operational position subsequent in time to that seen in FIG. 12.
Figure 14:
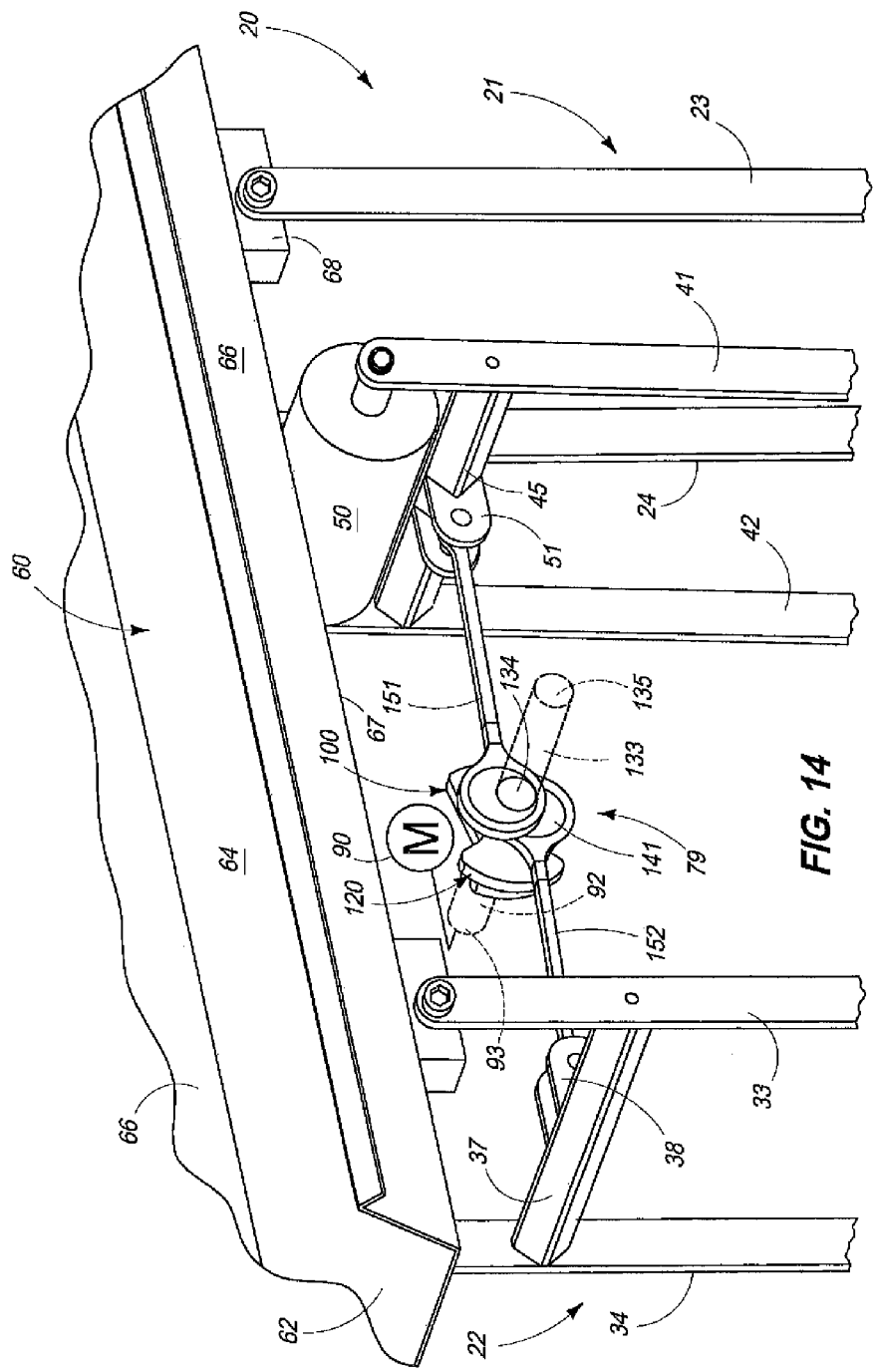
FIG. 14 depicts the present greatly simplified, invention at a subsequent point in time after that seen in FIG. 13.

Referring now to FIGS. 6-8 the present invention 10, and more specifically the elongated conveyor bed 60 is moveable along a reciprocal path of travel which is generally indicated by the numeral 160. This path of travel is defined between a first, forward position 161, and a second rearward position 162. In operation, the elongated conveyor bed, as a general matter, does not reciprocate at an equal velocity when moving in the direction of the first forward position 161, or in the second, rearward position 162. The readers attention is directed to FIGS. 3A, 3B and 3C where the conveyor bed displacement; conveyor bed velocity; and conveyor bed acceleration is graphically depicted. For example, and as a general matter, it will be understood that the elongated conveyor bed 60 when moved in the direction of the first forward position, moves at a velocity and with a displacement which carries the product 65 in a forward direction at a first, predetermined speed or velocity. Then, the conveyor bed 60, when reversing direction, and moving in the second direction, moves at a velocity or speed which is higher than the predetermined first speed. Therefore, the product 65 is slowly advanced, and the bed is then moved rapidly backwards so that the product 65 shuffles along the conveyor bed 60 when moving from one end to the other. In reviewing FIGS. 3A-3C, it will be understood that the rotation of the pair of eccentric weights 100, and 120 causes the elongated bed acceleration as graphically depicted, and which effects the motion of the product 65. In this regard, the elongated conveyor bed 60 is rendered operable, in a first mode of operation 163, wherein the product 65 moves from the first end 61, to the second end 62 at a predetermined speed (FIG. 4A). Further, and in a second mode of operation 164, the elongated conveyor bed 60 can be rendered operable such that the product 65 may move in a direction from the second end 62 towards the first end 61 (FIG. 4B). Still further, and in a third possible mode of operation 165; the elongated conveyor bed 60 can be rendered operable such that the product 65 can substantially stop movement once it is located between the first and second ends 61 and 62 of the conveyor (FIG. 4C). Additionally, it has been discovered that the present invention can move product 65 up an incline which has a pitch of less than about 7 degrees when measured from the horizontal plane.

To effect the several modes of operation 163, 164 and 165, respectively, of the elongated conveyor bed 160, the drive assembly 79 which includes the selectively energizable electric motor 90; the associated, selectively moveable motor mount 80; the first and second axles 92 and 133; the first and second eccentric weights 100, and 120; and the first and second drive members 151 and 152, respectively, is moveable in unison along a predetermined path of travel which is generally indicated by the numeral 180. This path of travel 180 is defined by a first position 181, which positions the motor mount 80 in a given position which effects the first mode of operation 163 of the elongated conveyor bed 60. Further, movement of the motor mount 80 to a second position 182 is operable to effect the second mode of operation 164 of the elongated conveyor bed 60. Still further, and when placed in an intermediate position 183, the motor mount 80, and associated electrically energizable motor 90 which comprise, at least in part, a portion of the drive assembly 79, is operable to effect the third mode of operation 165 of the elongated conveyor bed. Again, as was discussed in the paragraphs, above, and once energized, the electrically energizable motor 90 is effective to impart physical force so as to cause rotation of the first axle assembly 92. This rotation of the first axle 92 causes the first eccentric weight 100 to rotate. A drive link 113 is coupled to the first eccentric weight 100, and further transmits power or physical force to the second eccentric weight 120 thereby causing the subsequent rotation of the second eccentric weight 120, and the second axle 133 which is coupled therewith. The rotation of the second axle 133 is effective in causing the reciprocal, and eccentric rotational motion of the respective drive members 150. One of the pair of drive members 150, as earlier described, causes force to be transmitted to the second frame portion 22. The reciprocal motion of the second frame portion 22 along the course of travel 30 is effective in imparting reciprocal motion to the elongated conveyor bed 60. This reciprocal motion of the elongated conveyor bed takes place along the path of travel 160, and between the first and second positions 161 and 162, respectively, as discussed above. Simultaneously, the rotational movement of the second axle 133 is effective in causing the reciprocal motion of the counter weight 50 along the path of travel 52 between the first forward position 53, and the second rearward position 54. This coordinated movement of the various assemblies, as well as the force generated by the rotation of the first and second eccentric weights 100, and 120 is effective in causing the product 65 to move along the product transporting surface 64. As noted in the paragraphs above, the selective positioning of the drive assembly 79 which comprises, in part, the moveable mount 80, and the selectively energized electric motor 90 is effective in causing the elongated conveyor bed 60 to operate in several modes of operation (163, 164 and 165), and which provides several novel features for the present invention 10.

OPERATION

The operation of the described embodiment of the present invention 10 is believed to be readily apparent and is briefly summarized at this point.

A first aspect of the present invention relates to a linear motion conveyor 10, which, in its broadest aspect, includes an elongated conveyor bed 60 having opposite first and second ends 61 and 62, and a longitudinal axis 63, and wherein the elongated conveyor bed 60 further has a product transporting surface 64 which supports a product 65 for movement between the first and second ends 61 and 62, respectively of the elongated conveyor bed. Further, in its broadest aspect, the present invention 10 includes a drive assembly 79 which is oriented in predetermined force transmitting relation relative to the elongated conveyor bed 60, and which, when energized, imparts reciprocal motion to the elongated conveyor bed 60 to effect the selective movement of the product 65 along the product transporting surface 64 in a first direction which extends between the first and second ends 61 and 62 of the product transporting surface 64; a second direction which extends from the second end 62, to the first end 61 of the product transporting surface 64; and which further substantially stops the movement of the product 65 which is located between the first and second ends 61/62 of the elongated conveyor bed 60, all without deenergizing the drive assembly 79. In its broadest aspect of the present invention, the drive assembly 79 imparts reciprocal motion to the elongated conveyor bed 60 which has first and second movement components or portions 191, and 192, respectively. The first movement portion or component 191 carries the elongated conveyor bed 60 in a first direction, and at a first predetermined speed, and wherein the second movement portion or component 192 carries the elongated conveyor bed 60 in a second direction, which is opposite to the first direction, and at a second predetermined speed which is faster than the first predetermined speed. This is illustrated in FIGS. 4A-4C by means of the arrows 191 and 192, respectively, and wherein the longer length arrow, 191, depicts a slower velocity of the conveyor bed 60, and the shorter length arrow 192 depicts a higher velocity of the of the conveyor bed 60 in a direction opposite to the arrow 191. In the arrangement as seen in the drawings, the product transporting surface 64 is depicted as substantially horizontally oriented. However, in an alternative form of the invention, the product transporting surface 64 is non-horizontally oriented, and could be located at an angle of less than about 7 degrees from the horizontal. In the arrangement as seen in the drawings, the linear motion conveyor 10, as described, and more specifically the elongated conveyor bed 60 thereof reciprocates at a frequency of less than about 325 rpms; achieves an elongated bed displacement of less than about 2.0 inches; and further has an elongated bed acceleration which is imparted to the product 65 being transported of less than about 147 feet per second$^2$.

A further aspect of the present invention relates to a linear motion conveyor 10 which includes an elongated conveyor bed 60 having opposite first and second ends 61 and 62, and a product transporting surface 64 which supports a product, 65 for movement between the first and second ends 61 and 62 thereof. A base frame 20 is borne by a supporting surface 11, and which is pivotally affixed to the elongated conveyor bed 60. The base frame 20 renders the elongated conveyor bed 60 reciprocally moveable relative to the supporting surface 11. Such reciprocal movement of the elongated conveyor bed 60 effects the movement of the product 65 along the product transporting surface 64. A drive assembly 79 is coupled in force transmitting relation relative to the base frame 20, and which, when energized, transmits force to the base frame 20, to reciprocally rock the base frame, in opposite directions of movement which is effective to cause the elongated conveyor bed 60 to impart movement to the product 65 along the product transporting surface 64. The drive assembly 79, when energized, is selectively adjustable so as to cause the product 65 to move in a first direction, from the first to the second ends 61 and 62, respectively; a second direction, from the second end 62, and in the direction of the first end 61; and to further substantially prohibit the movement of the product 65 which is located between the first and second ends 61 and 62 of the product transporting surface 64.

The base frame 20 base frame has a first moveable frame portion 21 for supporting the first end 61 of the elongated conveyor 60, and a second moveable frame portion 22 which supports the second end 62 of the elongated conveyor bed 60. Each of the first and second frame portions 21/22 have a respective first end which is pivotally attached to the supporting surface 11, and an opposite second end which is pivotally mounted on the elongated conveyor bed 60. The drive assembly 79 is located between the first and second moveable frame portions 21/22. As seen in the drawings, a reciprocally moveable counter-weight frame 40 is mounted below the elongated conveyor bed 60, and which is further located between the drive assembly 79, and the first frame portion 21 of the base frame 20; and a counter-weight 50 is mounted on the moveable counter-weight frame 40, and further is reciprocally moveable therewith.

The linear motion conveyor 10 of the present invention further includes a first drive member 151 which is borne by the drive assembly 79, and which is coupled in force transmitting relation relative to the reciprocally moveable counter-weight frame 40, and which is additionally operable to cause the moveable counter-weight frame 40 to move along a reciprocal path of travel 52. Further, the linear motion conveyor 10 includes a second drive member 152 borne by the drive assembly, and which is coupled in force transmitting relation relative to the second moveable frame portion 22 of the base frame 20, and which is operable to cause the first and second moveable frame portions 21/22, of the base frame 20, to reciprocally move along a given path or travel 30, and then, correspondingly impart reciprocal motion to the elongated conveyor bed 60 when the drive assembly 79 is energized.

The elongated conveyor bed 60 has a longitudinal axis 63 which extends between the first and second ends 61/62, thereof. The drive assembly 79 is selectively movable along a substantially linear path of travel 180 which is located in predetermined, spaced, substantially parallel relation relative to the longitudinal axis 63 of the elongated conveyor bed 60. The path of travel 180 of the drive assembly 79 has a first operational position 181 along the path of travel 180, and which causes the elongated conveyor bed 60 to reciprocate such that the product transporting surface 64 moves the product 65 in a direction extending from the first to the second end 61/62 of the elongated conveyor bed 60; a second operational position 182, along the path of travel 180, and which causes the product transporting surface 64 to move the product 65 in a direction extending from the second end 62 of elongated conveyor bed 60 to the first end 61 thereof; and a third operational position 183, which causes the product transporting surface 64 of the elongated conveyor bed 60 to substantially stop the movement of the product along the product transporting surface 64. This path of travel 180 is typically less than about 5 inches.

The linear motion conveyor 10, which includes the drive assembly 79 further includes, at least in part, a motor mount 80; and a selectively energizable motor 90 which is mounted on the motor mount 80, and which further has an output shaft 91. The drive assembly 79 further includes a first axle 92 which is mounted below the elongated conveyor bed 60, and in a substantially horizontal orientation, and transversely relative to the longitudinal axis 63 of the elongated conveyor bed 60. The output shaft 91, of the motor 90 is coupled in rotatable, driving relation relative to the first axle 92, and is further operable to impart rotational movement to the first axle 92. A first eccentric weight 100 is mounted on the first axle 92, and which is further co-rotatable therewith. The first eccentric weight 100 has a first end, portion, or region 107, and an opposite second end, portion, or region 108. This is best seen to FIG. 15. A second eccentric weight 120 is provided, and which is mounted on the first end 134 of the second axle 133, and which is co-rotatable therewith. The second eccentric weight 120 has a first, and an opposite, second end, portion or region 107/108, respectively. A drive link 113 forcibly couples the first end portion or region 107/127 of each of the first and second eccentric weights 100/120 together. Upon energizing the motor 90 the subsequent rotation of the first eccentric weight 100 is operable to transmit force by way of the drive link 113 so as to facilitate a subsequent rotation of the second, eccentric weight 120, and the second axle 133. The rotation of the second axle 133 imparts reciprocal, eccentric force to the first and second drive members 151/152 so as to cause the predetermined reciprocal motion of the counter-weight frame 40, and the subsequent reciprocal motion of the second frame portion 22, of the base frame 20. The counter weight 50 has a weight which is about 80% to about 120% of the weight of the elongated conveyor bed 60. These coordinated reciprocal motions of the respective elements, noted above, along with the individual forces exerted by the respective eccentric weights 100, and 120, respectively, effects the predetermined motion of the product 65 along the elongated conveyor bed 60, as earlier described.

Therefore, it will be seen that the linear motion conveyor 10 of the present invention provides assorted advantages and novel features not present in devices of similar design. The present invention provides a convenient means whereby, without deenergizing the drive assembly 79, an operator, on the one hand, can move product 65 in a given first direction between the first and second ends 61 and 62 of the elongated conveyor bed 60; or in the alternative, stop the movement of product 65 at a location between the first and second ends 61 and 62, or in still another possible operational mode, reverse direction of the product thereby causing the product to move from the second end 62 and in the direction of the first end 61 thereof.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A linear motion conveyor, comprising:
an elongated reciprocally moveable conveyor bed having opposite first and second ends, and a longitudinal axis, and wherein the elongated conveyor bed further has a product transporting surface which supports a product for movement between the first and second ends of the elongated conveyor bed;
a selectively moveable motor mount which is located below, and oriented in force transmitting relation relative to the elongated conveyor bed, and which is moveable along a predetermined path of travel which is disposed in parallel, spaced relation relative to the elongated, reciprocally moveable conveyor bed;
a drive assembly oriented in predetermined force transmitting relation relative to the elongated conveyor bed and wherein the drive assembly includes a selectively energizable motor which is mounted on, and moves in unison with the selectively moveable motor mount, and a pair of spaced, eccentric weights which are rotatably supported on the selectively moveable motor mount, and are moveable therewith, and wherein the selectively energizable motor, when energized, imparts reciprocal motion to the elongated conveyor bed and rotates the pair of spaced, eccentric weights, so as to effect the selective movement of the product along the product transporting bed, by an adjustment of the moveable motor mount, in a first direction which extends between the first and second ends of the product transporting surface; in a second direction which extends from the second end, to the first end of the product transporting surface; and which further substantially stops the movement of the product which is located between the first and second ends of the elongated conveyor bed.

2. A linear motion conveyor as claimed in claim 1, and further comprising:
a moveable base frame mounted on a supporting surface, and which is pivotally mounted to the elongated conveyor bed, and wherein the base frame locates the elongated conveyor bed in predetermined, spaced relation relative to the supporting surface, and wherein the moveable base frame has a first frame portion, and a second frame portion, and wherein the first frame portion movably supports the first end of the elongated conveyor bed, and the second frame portion moveably supports the second end of the elongated conveyor bed, and wherein each of the first and second frame portions each have a first end which is pivotally mounted on the supporting surface; and an opposite second end which is pivotally mounted on the elongated conveyor bed, and wherein the selectively moveable motor mount is mounted on the supporting surface, and disposed in force transmitting relation relative to the moveable base frame.

3. A linear motion conveyor as claimed in claim 2, and further comprising:
a counter-weight frame which is pivotally mounted on the supporting surface, and which is further located between the first and second frame portions, and below, the elongated conveyor bed, and wherein the counter-weight frame has a proximal end which is pivotally mounted on the supporting surface, and an opposite distal end which is located in spaced relation relative to the elongated conveyor bed; and a counter-weight mounted on the distal end of the counter-weight frame, and which is reciprocally moveable relative to the drive assembly.

4. A linear motion conveyor as claimed in claim 3, and wherein the elongated conveyor bed has a given weight, and wherein the counter-weight has a weight which is at least about 80% to about 120% of the weight of the elongated conveyor bed.

5. A linear motion conveyor as claimed in claim 3, and further comprising:
a first drive member borne by the drive assembly, and which extends from the drive assembly, and is further drivingly coupled to the counter-weight frame, and wherein force applied by the drive assembly to the first drive member imparts reciprocal motion to the drive frame, and the associated counter-weight; and
a second drive member borne by the drive assembly and which extends from the drive assembly, and is drivingly coupled to the second frame portion, and wherein force applied by the drive assembly to the second drive member imparts reciprocal motion to the second drive frame, and a corresponding reciprocal motion to the elongated conveyor bed.

6. A linear motion conveyor as claimed in claim 5, and wherein
the selectively energizable motor has an output shaft, and wherein the linear motion conveyor further includes a first axle mounted below the elongated conveyor bed, and in a substantially horizontal orientation, and transversely relative to the longitudinal axis of the elongated conveyor bed, and wherein the output shaft of the selectively energizable motor is coupled in driving relation relative to the first axle, and is operable to impart rotational movement to the first axle, and wherein the pair of eccentric weights includes a first eccentric weight mounted on the first axle and which is co-rotatable therewith, and wherein the first eccentric weight has a first end, and an opposite second end;
a second axle mounted below the elongated conveyor bed, and in a substantially horizontal orientation and transversely relative to the longitudinal axis of the elongated conveyor bed, and wherein the second axle is located in a substantially parallel, non-coaxial orientation relative to the first axle, and wherein the second axle has a first, and an opposite second end, and wherein the first and second drive members are eccentrically drivingly coupled to the second axle, and wherein the pair of eccentric weights further includes a second eccentric weight mounted on the first end of the second axle, and which is co-rotatable therewith, and wherein the second eccentric weight has a first and an opposite, second end; and
a drive link coupling the first end of each of the first and second eccentric weights together, and wherein upon energizing the selectively energizable motor the subsequent rotation of the first eccentric weight is operable to transmit force through the drive link so as to facilitate a subsequent rotation of the second, eccentric weight, and the second axle, which is coupled therewith, and wherein the rotation of the second axle imparts eccentric reciprocal force to the first and second drive members so as to cause the predetermined reciprocal motion of the counter-weight frame, and the second frame portion of the base frame.

7. A linear motion conveyor as claimed in claim 6, and wherein the first and second axles are selectively moveable, in unison, along the given, path of travel with the selectively moveable motor mount so as to effect movement of the product in the first and second directions along the elongated conveyor bed, and to further substantially prohibit the movement of the product between the first and second ends of the elongated conveyor bed.

8. A linear motion conveyor as claimed in claim 7, and wherein the drive assembly imparts reciprocal motion to the elongated conveyor bed which has a first and second movement components, and wherein the first movement component carries the elongated conveyor bed in a first direction, and at a first predetermined velocity, and wherein the second movement component carries the elongated conveyor bed in a second direction, which is opposite to the first direction, and at a second predetermined velocity which is faster than the first predetermined speed.

9. A linear motion conveyor as claimed in claim 8, and wherein the respective first and second eccentric weights are located in a first predetermined rotational position, one relative to the other to effect the first movement component, and in a second, predetermined rotational position, one relative to the other, to effect the second movement component.

10. A linear motion conveyor as claimed in claim 9, and wherein the reciprocal motion of the counter-weight frame has a first and second movement components, and wherein the first movement component of the counter-weight frame carries the counter-weight frame in a first direction which is towards the drive assembly, and the second movement component of the counter-weight frame carries the counter-weight frame in a second direction which is away from the drive assembly, and wherein the first movement component of the counter-weight frame occurs substantially simultaneously as the first movement portion of the elongated conveyor bed carries the elongated conveyor bed in the first direction, and wherein the second movement component of the of the counter-weight frame occurs substantially simultaneously when the second movement component of the elongated conveyor bed carries the elongated conveyor bed in the second direction.

11. A linear motion conveyor bed as claimed in claim 1, and wherein product transporting surface is substantially horizontally oriented.

12. A linear motion conveyor as claimed in claim 1, and wherein the product transporting bed is non-horizontally oriented, and at an angle of not greater than about 7 degrees from the horizontal.

13. A linear motion conveyor as claimed in claim 10, and wherein the path of travel of the respective first and second axles moving in unison with the moveable motor mount is less than about 5 inches.

14. A linear motion conveyor as claimed in claim 10, and wherein the respective first and second eccentric weights each have a substantially similar weight.

15. A linear motion conveyor as claimed in claim 10, and wherein the elongated conveyor bed reciprocates at a frequency of less than about 325 RPM; achieves an elongated bed displacement of less than about 2.0 inches; and further has an elongated bed acceleration which is imparted to the product being transported of less than about 147 ft/sec$^2$.

16. A linear motion conveyor, comprising:
an elongated conveyor bed having opposite first and second ends, and a product transporting surface which supports a product for movement between the first and second ends of the elongated conveyor bed;
a base frame borne by a supporting surface, and which is pivotally affixed to the elongated conveyor bed, and wherein the base frame renders the elongated conveyor bed reciprocally moveable relative to the supporting surface, and wherein such reciprocal movement of the elongated conveyor bed effects the movement of the product along the product transporting surface; and
a drive assembly coupled in force transmitting relation relative to the base frame, and which, when energized, transmits force to the base frame, to reciprocally rock the base frame, so as to cause the elongated conveyor bed to impart movement to the product along the product transporting surface, and wherein the drive assembly includes a moveable motor mount which is mounted on the supporting surface and is further disposed in force transmitting relation relative to the base frame; a pair of rotatable eccentric weights which are borne by the motor mount, and are moveable therewith; and a selectively energizable motor which is moveable with the motor mount and coupled to at least one of the eccentric weights, and wherein the, motor mount is selectively adjustable so as to further cause the product to move in a first direction, from the first to the second end of the elongated conveyor bed; in a second direction, from the second end, and in the direction of the first end thereof; and to further substantially prohibit the movement of the product which is located between the first and second ends of the product transporting surface, and wherein the selectively energizable motor, when energized, rotates in a single direction.

17. A linear motion conveyor as claimed in claim 16, and wherein the base frame has a first moveable frame portion for supporting the first end of the elongated conveyor, and a second moveable frame portion which supports the second end of the elongated conveyor bed, and wherein each of the first and second frame portions have a respective first end which is pivotally attached to the supporting surface, and an opposite, second end which is pivotally mounted on the elongated conveyor bed, and wherein the drive assembly is located between the first and second moveable frame portions.

18. A linear motion conveyor as claimed in claim 17, and further comprising:
a reciprocally moveable counter-weight frame mounted below the elongated conveyor bed, and which is further located between the drive assembly, and the first frame portion of the base frame; and
a counter-weight mounted on the moveable counter-weight frame and which is reciprocally moveable therewith.

19. A linear motion conveyor as claimed in claim 18, and further comprising:
a first drive member borne by the drive assembly and which is coupled in force transmitting relation relative to the reciprocally moveable counter-weight frame, and which is operable to cause the moveable counter-weight frame to move along a reciprocal path of travel; and
a second drive member borne by the drive assembly, and which is coupled in force transmitting relation relative to the second moveable frame portion of the base frame, and which is operable to cause the first and second moveable frame portions, of the base frame, to reciprocally move along a given path or travel, and impart reciprocal motion to the elongated conveyor bed.

20. A linear motion conveyor as claimed in claim 19, and wherein the elongated conveyor bed has a longitudinal axis which extends between the first and second ends, thereof, and wherein the selectively moveable motor mount is selectively movable along a substantially linear path of travel which is located in predetermined, spaced, substantially parallel relation relative to the longitudinal axis of the elongated conveyor bed, and wherein the path of travel of the moveable motor mount has a first operational position along the path of travel which causes the elongated conveyor bed to reciprocate such that the product transporting surface moves the product in a direction extending from the first to the second end of the elongated conveyor bed; a second operational position along the path of travel which causes the product transporting surface to move the product in a direction extending from the second end of elongated conveyor bed to the first end thereof; and a third operational position which causes the product transporting surface of the elongated conveyor bed to substantially stop the movement of the product along the product transporting surface.

21. A linear motion conveyor as claimed in claim 20, and wherein the selectively energizable motor which is mounted on the motor mount, further has an output shaft, and wherein a first axle is mounted below the elongated conveyor bed, and in a substantially horizontal orientation, and transversely relative to the longitudinal axis of the elongated conveyor bed, and wherein the output shaft of the selectively energizable motor is coupled in driving relation relative to the first axle, and is operable to impart rotational movement to the first axle, and wherein the pair of eccentric weights includes a first and second eccentric weight, and wherein the first eccentric weight is mounted on the first axle and which is co-rotatable therewith, and wherein the first eccentric weight has a first end, and an opposite second end and wherein a second axle is mounted below the elongated conveyor bed, and in a substantially horizontal orientation, and transversely relative to the longitudinal axis of the elongated conveyor bed, and wherein the second axle is located in a substantially parallel, non-coaxial orientation relative to the first axle, and wherein the second axle has a first, and an opposite second end, and wherein the first and second drive members are eccentrically, drivingly coupled to the second axle, and wherein the second eccentric weight is mounted on the first end of the second axle, and which is co-rotatable therewith, and wherein the second eccentric weight has a first and an opposite, second end; and a drive link coupling the first end of each of the first and second eccentric weights together, and wherein upon energizing the motor the subsequent rotation of the first eccentric weight is operable to transmit force through the drive link so as to facilitate a subsequent rotation of the second, eccentric weight, and the second axle, and wherein the rotation of the second axle imparts an eccentric rotational force to the first and second drive members so as to cause the predetermined reciprocal motion of the counter-weight frame, and the reciprocal motion of the second frame portion of the base frame.

22. A linear motion conveyor, comprising:

an elongated conveyor bed having opposite first and second ends, a top surface defining a product transporting surface which supports a product for movement between the respective opposite ends of the elongated conveyor bed, and a bottom surface, and wherein the elongated conveyor bed is supported in spaced relation relative to an underlying supporting surface;

a base frame having first and second moveable frame portions which individually, moveably support the respective first and second ends of the elongated conveyor bed in spaced relation relative to the supporting surface, and wherein each of the first and second moveable frame portions have a respective first end which is pivotally attached to the supporting surface, and an opposite second end, which is pivotally affixed to the bottom surface of the elongated conveyor bed;

a reciprocally moveable counter-weight frame mounted below, and in spaced relation relative to the elongated conveyor bed, and between the first and second moveable frame portions;

a counter-weight mounted on the moveable counter-weight frame, and which is reciprocally moveable with the moveable counter-weight frame;

a selectively moveable motor mount which is borne by the supporting surface, and which is further located below the bottom surface of the elongated conveyor bed, and is further moveable along a predetermined path of travel;

a selectively energizable motor mounted on the moveable motor mount, and which further has an output shaft, and which is further moveable in unison with the moveable motor mount;

a first axle mounted below, and transversely relative to the elongated conveyor bed, and which is further coupled in force receiving relation relative to the output shaft of the selectively energizable motor, and wherein the selectively energizable motor, when actuated, imparts rotational movement to the first axle, and wherein the first axle moves in unison with the moveable motor mount;

a first eccentric weight mounted on the first axle, and which is co-rotatable therewith, and wherein the first eccentric weight has a first, and an opposite second end;

a second axle mounted below, and transversely relative to the elongated conveyor bed, and which is further located in a substantially parallel, non-coaxial orientation relative to the first axle, and wherein the second axle moves in unison with the moveable motor mount;

a second eccentric weight mounted on the second axle, and which is co-rotatable therewith, and wherein the second eccentric weight has a first end, and an opposite, second end;

a first drive member having a first end which is eccentrically, rotatably coupled to the second axle, and an opposite, second end, which is coupled in force transmitting relation relative to the reciprocally moveable counter-weight frame, and wherein rotation of the second axle imparts reciprocal motion to the counter-weight frame;

a second drive member having a first end which is eccentrically, rotatably coupled to the second axle, and an opposite, second end, which is coupled in force transmitting relation relative to the second moveable frame portion, and wherein rotation of the second axle imparts reciprocal motion to the second, moveable frame portion, and further causes the elongated conveyor bed to reciprocate at a given speed, and which is effective in moving the product along the product transporting surface; and a drive link rotatably coupling together the first end of each of the first and second eccentric weights, and wherein the rotation of the first axle by the energizing of the selectively energizable motor transmits rotational force to the second axle by way of the drive link, and further causes the generation of a predetermined amount of vibratory force which is imparted to the elongated conveyor bed by the rotation of the first and second eccentric weights, and wherein the generated vibratory force, in combination with the reciprocal movement of both the counter-weight frame, which carries the counter-weight, and the reciprocal motion of the elongated conveyor bed effects the movement of the product along the product transporting surface, and wherein the selective positioning of the moveable motor mount along the predetermined path of travel causes the elongated conveyor bed to selectively transport product along the product transporting surface in a first direction which extends from the first to the second end thereof; in a second direction which extends from the second end to the first end thereof; and which further prohibits the movement of the product which is located between the first and second ends of the elongated conveyor bed.

23. A linear motion conveyor, comprising:

an elongated conveyor bed having opposite first and second ends, and a longitudinal axis, and wherein the elongated conveyor bed further has a product transporting surface which supports a product for moment between the first and second ends of the elongated conveyor bed;

a selectively moveable motor mount which is located below the elongated conveyor bed, and positioned between the first and second ends thereof, and wherein the selectively moveable motor mount is moveable along a predetermined path of travel which is disposed in parallel, spaced relation relative to the longitudinal axis of the elongated conveyor bed;

a selectively energizable motor for imparting reciprocal motion to the elongated conveyor bed, and which is mounted on, and moves in unison with the moveable motor mount, and further, when energized, rotates in a single direction;

a pair of spaced, eccentric weights which are rotatably supported on the selectively movable motor mount, and are further simultaneously moveable with the motor mount along the predetermined path of travel, and wherein the selectively energizable motor is drivingly coupled to one of the eccentric weights; and a drive link coupling the respective spaced eccentric weights together so that rotation of one of the eccentric weights by the selective energizing of the motor imparts a simultaneous rotation of the other eccentric weight, and wherein rotation of the pair of spaced eccentric weights creates a driving force which imparts predetermined reciprocal motion to the elongated conveyor bed, and a simultaneous movement of the product along the product surface in a given direction between the first and second ends thereof, and wherein an orientation of the selectively moveable motor mount in a predetermined first position along the predetermined path travel is effective in causing movement of the product from the first end of the elongated conveyor bed, to the second end thereof, and wherein an orientation of the selectively moveable motor mount in a second position along the predetermined path of travel is effective in causing movement of the product from the second end of the elongated conveyor bed, to the first end thereof, and wherein an orientation of the selectively moveable motor mount in a third position along the predetermined path of travel is effective in stopping movement of the product between the first and second ends of the elongated conveyor bed.

* * * * *